US008676721B2

(12) United States Patent
Piovesan et al.

(10) Patent No.: US 8,676,721 B2
(45) Date of Patent: Mar. 18, 2014

(54) METHOD, SYSTEM AND APPARATUS FOR INTELLIGENT MANAGEMENT OF OIL AND GAS PLATFORM SURFACE EQUIPMENT

(75) Inventors: Carol M. Piovesan, Houston, TX (US); Jess B. Kozman, Spring, TX (US)

(73) Assignee: APO Offshore, Inc., Houston, TX (US)

( * ) Notice: Subject to any disclaimer, the term of this patent is extended or adjusted under 35 U.S.C. 154(b) by 689 days.

(21) Appl. No.: 12/884,150

(22) Filed: Sep. 16, 2010

(65) Prior Publication Data

US 2011/0071963 A1  Mar. 24, 2011

Related U.S. Application Data

(60) Provisional application No. 61/244,015, filed on Sep. 18, 2009.

(51) Int. Cl.
G06F 17/00 (2006.01)
G06F 17/20 (2006.01)

(52) U.S. Cl.
USPC .......................................................... 706/11

(58) Field of Classification Search
None
See application file for complete search history.

(56) References Cited

U.S. PATENT DOCUMENTS

| | | | |
|---|---|---|---|
| 4,433,581 A | 2/1984 | Scott et al. | |
| 5,111,531 A | 5/1992 | Grayson et al. | |
| 5,208,748 A | 5/1993 | Flores et al. | |
| 5,349,541 A | 9/1994 | Alexandro, Jr. et al. | |
| 5,442,730 A | 8/1995 | Bigus | |
| 5,710,578 A | 1/1998 | Beauregard et al. | |
| 6,243,615 B1 | 6/2001 | Neway et al. | |
| 6,701,514 B1 | 3/2004 | Haswell et al. | |
| 6,732,052 B2 * | 5/2004 | Macdonald et al. | 702/6 |
| 6,954,737 B2 | 10/2005 | Kalanter et al. | |
| 7,584,165 B2 | 9/2009 | Buchan | |
| 2002/0161685 A1 * | 10/2002 | Dwinnell | 705/36 |
| 2006/0092766 A1 * | 5/2006 | Shelley et al. | 367/72 |
| 2007/0244841 A1 | 10/2007 | Vatchkov et al. | |
| 2008/0000688 A1 * | 1/2008 | McLoughlin et al. | 175/40 |

OTHER PUBLICATIONS

'Self-Organization of a massive document collection': Kohonen, 2000, IEEE, 1045-9227, pp. 574-585.*
'Self-Organizing Maps': Kohonen, 2001, Springer.*
'On refining equipment condition monitoring using fuzzy sets and artificial neural networks': Tomsovic, 1997, engineering intelligent systems ... Citeseer.*
PCT International Search Report in counterpart PCT application PCT/US2010/049325 mailed Apr. 29, 2011, 2 pages.

(Continued)

*Primary Examiner* — Kakali Chaki
*Assistant Examiner* — Peter Coughlan
(74) *Attorney, Agent, or Firm* — Gordon G. Waggett, P.C.

(57) ABSTRACT

A method, system, apparatus (and related computer program) for intelligent management of oil and gas offshore and onshore platform surface equipment over a computer network is disclosed. The system utilizes a data aggregator for gathering real-time data streams from surface equipment located on such platform(s), such surface equipment containing one or more sensors for monitoring in real time the performance of equipment operational parameters of interest. The data analysis engine is in network communication with the data aggregator, and comprises a trained neural network capable of generating self organizing maps, and creating predictive operational parameters regarding such surface equipment. An interface is provided for inputting into the neural network various data including, for example, the published performance operational parameters for such equipment. A network user interface is also provided for transmitting such predictive operational input to one or more end user terminals equipped with end user dashboard display software.

17 Claims, 9 Drawing Sheets

(56) References Cited

OTHER PUBLICATIONS

PCT Written Opinion in counterpart PCT application PCT/US2010/049325 mailed Apr. 29, 2011, 3 pages.

PCT Transmittal of ISR and WO in counterpart PCT application PCT/US2010/049325 mailed Apr. 29, 2011, 2 pages.

Athens Group, 2009. The State of NPT on High Specification Offshore Rigs: First Annual Benchmarking Report Whitepaper, http://www.athensgroup.com/docs/The_State_of_NPT_on_High_Specification_Offshore_Rigs.pdf. Downloaded Jun. 22, 2009, 14 pages.

Brynjolfsson, E, 1994. The Productivity Paradox of Information Technology: Review and Assessment. http://ccs.mit.edu/papers/CCSWP130/ccswp130.html, MIT Sloan School of Management, last downloaded Sep. 12, 2011, 20 pages.

Brynjolfsson, E. and Hitt, L., 2003. Computing Productivity: Firm-level Evidence. Review of Economics and Statistics, MIT Sloan Working Paper No. 4210-01. SSRN: http://ssrn.com/abstract=290325, DOI: 10.2139/ssrn.290325, 43 pages.

Cisco, 2007. Petroleum Company Improves Real-time Information Sharing with Rigs, Cisco Customer Case Study, printed in the UK 31530/ecoutez/feb.07, http://www.cisco.com/web/strategy/docs/energy/Caseworks_31530_Petrobel_CS.pdf, downloaded Jun. 22, 2009, 5 pages.

Cohen, A.S., and Nielson, D.L., 2007. Best Practices in the Development of Scientific Drilling Projects, Second Edition. U.S. National Science Foundation, http://www.dosecc.org/Best_Practices_-_2nd_Ed_-_FINAL.pdf. Downloaded Jun. 22, 2009, 32 pages.

Eustes III, A. W., 2007. The Evolution of Automation in Drilling. Paper SPE-111125 presented at the 2007 SPE Annual Technical Conference and Exhibition, Anaheim, California, U.S.A., Nov. 11-14, 2007, 5 pages.

Feineman, D.R., 2009. Realizing Value From Real Time Well Monitoring in Greenfield Assets. Paper SPE-122676-MS presented at the SPE Digital Energy Conference and Exhibition, Apr. 7-8, 2009, Houston, Texas, USA. 10.2118/122676-MS, 8 pages.

Gottlieb, A., 2004. Satellite Service Providers and the Battle for the Oilfield Customer—How Application Focused Technologies are Changing the Market. SatMagazine.com, Jan. 2004, Satnews Publishers, Sonoma, CA, downloaded Jun. 22, 2009. http://www.satmagazine.com/jan2004/jan2004.pdf, pp. 29-32 (34 pages).

Grovik, L.O., 2009. WITSML status and road ahead in StatoilHydro. Presented at the Energistics WITSML Public Seminar & Vendor Exhibition meeting, May 28, 2009, Houston, Texas, USA. Downloaded Jun. 22, 2009, http://www.witsml.org/images/posc/meetings/may09witpub/03-LO.Grovik-StatoilHydro.pdf, 17 pages.

Hacker, J.M., 2008. An IOC's Experience in Implementing Digital Oilfield Technologies. Presented at the Abu Dhabi International Petroleum Exhibition and Conference, Nov. 3-6, 2008, Abu Dhabi, UAE. SPE-117837-MS DOI: 10.2118/117837-MS, 11 pages.

Henry-Balli, R., 2009. Alwyn Field Case Study. Presented at the WITSML Public Seminar & Vendor Exhibition meeting, May 28, 2009, Houston, Texas, USA. Downloaded Jun. 22, 2009, http://www.witsml.org/images/posc/meetings/apr09StdsSeminar/apr09_ss_Henri-Bally_Total.pdf, 32 pages.

Heiberger, E., 2009. The Wisdom of Maturity. offshore-technology.com, SPG Media, Apr. 8, 2009. Downloaded Jun. 22, 2009. http://www.offshore-technology.com/features/feature52931/, 5 pages.

Kozman, J., 2004. Applying Innovative Information Technologies to Oil & Gas Project Content. Pipeline Magazine, Issue 86, Mar. 2004, http://www.pipelinedubai.com.

Kozman, J. and Gimenez, L., 2004. Maturity Models for E&P Data and Information Management Organizations. Presented at the Abu Dhabi International Conference and Exhibition, Oct. 10-13, 2004, Abu Dhabi, United Arab Emirates. SPE 88666-MS, 10.2118/88666-MS, 8 pages.

Kozman, J. and Ripley, T., 2008. Sustainable Spatial Architecture for Geo Engineering Data and Workflows. Paper SPE-116709 presented at the SPE Annual Technical Conference and Exhibition, Denver, Colorado, USA, Sep. 21-24, 2008, 20 pages.

Kozman, J., 2009. Enterprise Deployments of Model-Centric Workflows. Presented at the 13th International PNEC Conference on Data Integration, May 12-14, 2009 Houston, Texas, USA, 8 pages.

Levson, V., Walsh, W., Adams, C., Ferri, F., and Hayes, M., 2009, An Overview of Shale Gas Potential in Northeastern British Columbia. Presented at the 2009 CSPG CSEG CWLS Convention, May 4 to May 8, Calgary, Alberta, Canada, http://www.geoconvention.org/2009abstracts/236.pdf, downloaded Jun. 22, 2009, 3 pages.

Microsoft PressPass, 2008. Compute power drives productivity, decision-making; reduces drilling delays and project risk. Mar. 2008, http://www.microsoft.com/presspass/press/2008/mar08/03-25HPCSurveyPR.mspx, downloaded Jun. 22, 2009, 4 pages.

Oberwinkler, C. and Stundner, M., 2005. From Real-Time Data to Production Optimization. SPE Production & Facilities 20 (3): 229-239. SPE-87008-PA, 10.2118/87008-PA, 14 pages.

Reece, C., Hoefner, M.L., Seetharam, R.V., and Killian, K.E., 2008. An Enterprise-Wide Approach to Implementing 'Digital Oilfield'. Presented at the Intelligent Energy Conference and Exhibition, Feb. 25-27, 2008, Amsterdam, The Netherlands. SPE-112151-MS, 10.2118/112151-MS, 6 pages.

Schlumberger, 2009. Avocet Surveillance powered by BabelFish. http://www.slb.com/media/services/software/production/avocet-surveillance.pdf downloaded Sep. 12, 2009, 4 pages.

Schlumberger, 2009. Avocet Surveillance powered by BabelFish—Integrated Date and Visualization Framework for Production Operations. http://www.slb.com/contentiservices/software/production/avocetsurveillance.asp Sep. 12, 2009, 1 page.

Shafer, D., 2005. Would you like software with that? Presented at the AADE 2005 National Technical Conference and Exhibition, Houston, Texas, Apr. 5-7, 2005. AADE-05-NTCE-41, 8 pages.

Shamsan, F. and Kumar, K. The Role of Geographical Information System in Land Acquisition and Optimization of Well Location. Presented at the SPE Middle East Oil and Gas Show and Conference, Mar 12-15, 2005, Kingdom of Bahrain. SPE-93710-MS, 10.2118/93710-MS, 6 pages.

Stundner, M. and Nunez, G., 2006. Production Performance Monitoring Workflow. Presented at the First International Oil Conference and Exhibition, Cancun, Mexico, Aug. 31-Sep. 2, 2006. SPE 103757-MS, 10.2118/103757-MS, 6 pages.

Wood, T., 2007. The Connected Oilfield. Cisco Whitepaper, downloaded Jun. 22, 2009, Cisco Internet Business Solutions Group (IBSG). http://www.cisco.com/web/aboutfac79/docs/wp/Connected_Oilfield_0629b.pdf, 11 pages.

Wright, J., 2000. The Future of Fiber Optics in the Offshore Oil Industry (A review of the subsea applications of optical fiber). Published as: Optical fiber's gigabit bandwidth, 200km range attractive for subsea work. Offshore Magazine, May 2000. www.oceandesigninc.Com, 8 pages.

Tail Integrated Operations, Project Newsletter 02, Statoil / ABB, (2008), 9 pages.

Brynjolfsson, E. and Yang, S., Information Technology and Productivity: A Review of the Literature, Nov. 27, 2000, 70 pages.

Piovesan, C., Kozman, J., Crow, C. And Taylor, C., Real-Time Equipment Management on Intelligent Platforms, presented at the SPE Annual Technical Conference and Exhibition, New Orleans, LA, Oct. 4-7, 2009. 1 page.

Piovesan, C., "An Intelligent 'Platform' to Manage Offshore Assets", E&P. R&D Report, www.EPMag.com, Jan. 2009, pp. 52-53 (2 pages).

Reif, D. and Kennedy, M., The Case for Digital Technology in the LNG World, World Energy, vol. 8, No. 4 (2005), pp. 74-77 (4 pages).

SPE, Undated: Prior art Chart entitled "Integrating Information Systems & Assets" available from http://communities.spe.org/TIGS/RTO/default.aspx. 1 page.

EMIDOI—Electronic Marketplace for Information on Decommissioning of Offshore Platforms, Offshore Activities, http://www.decomplatfoim.com/offshore/content_htm.

Benwell, T., 2010. "Can You Afford to Take the Risk?; The Case for Collaboration on Risk Mitigation for High-Specification Offshore Assets", Copyright Athens Group 2010, http://www.athensgroup.com/images/stories/articles/

(56) References Cited

OTHER PUBLICATIONS can%20you%20afford%20the%20risk%20viewpoint%20nov2010. pdf, last retrieved Sep. 12, 2011, first accessed Aug. 12, 2010, 8 pages.
Piovesan, C., and Kozman, J. An Intelligent Platform to Manage Offshore Assets. SPE 124514, 2009, prepared for presentation at the 2009 SPE Annual Technical Conference and Exhibition, New Orleans, LA, Oct. 4-7, 2009. [Abstract only, applicant does not presently have a full copy].
Al-Khamis, M. N., Al-Hamzani, H. J., and Al-Adel, M. F., 2009. "Revamping Old Fields Using I-Field Technologies", SPE Paper #123540, 2009 SPE Annual Technical Conference and Exhibition, New Orleans, Louisiana, USA, Oct. 4-7, 2009, Copyright 2009, Society of Petroleum Engineers, http://spe.org/atce/2009/pp./schedule/documents/ spe1235401_000.pdf, accessed Nov. 1, 2009 [Abstract only, applicant does not presently have a full copy].
Cramer, R., 2010. "Virtues of a virtual person monitoring all real aspects of all production facilities all of the time", SPE Intelligent Energy Conference and Exhibition, Mar. 23-25, 2010, Utrecht, The Netherlands, Paper No. 127513-MS, Copyright 2010. Society of Petroleum Engineers, DOI 10.2118/127513-MS [Abstract only, applicant does not presently have a full copy].
Dunham, C., 2009. "ESP ESP-Reliability Information and Failure Tracking System, Joint Industry Project, Overview", C-FER Technologies, Mar. 2009, http://www.esprifts.com/Slide%20Presentation.pdf, Mar. 2009.
"Literature Review"—2010 Digital Energy Workshop, The Value of Real Data, SPE Gulf Coast Section, Jun. 8, 2010. http://www.spegcs.org/attachments/studygroups/4/DE%20Workshop%20Literature%20Review%20Slides.pdf 9 pages.
Goodwin, S., Ford, A., Griffiths, P., Moore-Cernock, K., Williams, P., 2010. "Advanced Collaborative Environments—The Growth of a Capability Transformation", SPE Intelligent Energy Webinar, SPE Paper #128650, www. intelligentenergyevent.com/page.cfm/link=133, accessed Sep. 28, 2010. [Abstract only, applicant does not presently have a full copy].
Perrons, R.K., 2010. "Perdido Ties Together Shell Digital Oilfield Technologies", World Oil, vol. 231, No. 5, May 2010, www.worldoil.com/Perdido-ties-together-shell-digital-oilfield-technologies.html, Gulf Publishing Company, Houston, TX, USA.
Ramdial, A.M., Hudson, N. H., Pike, R. G., Rodriguez, J. C., Stratman, M. S., and Sama, S. S., 2009. "Model-Based Optimisation of a Gas Production System—The BP Trinidad Field Optimiser", SPE Paper #124720, 2009 SPE Annual Technical Conference and Exhibition, New Orleans, Louisiana, USA, Oct. 4-7, 2009, Copyright 2009, Society of Petroleum Engineers, http://spe.org/atce/2009/pages/schedule/documents/spe1247201_000.pdf, accessed Nov. 1, 2009 [Abstract only, applicant does not presently have a full copy].
Piovesan, Carol and Kozman, Jess, Jul. 21, 2009, "An intelligent platform to manage offshore assets" downloaded from http://apooffshore.com/i-platform-solution-overview/whitepapers, 7 pages.
Society of Petroleum Engineers Annual Technical Conference and Exhibition New Orleans (Oct. 2009), Abstract from the Data Room's Technology Watch from the 2009 SPE ATCE. 4 pages.
Kozman, J.B., "W011: Setting the Correct Data Management Level for Model Centric Workflows", 71st EAGE Conference & Exhibition—Amsterdam, The Netherlands, Jun. 8-11, 2009, available on http://cltechconsulting.com/publications.html.
Perez, S.C., Nguye, V., Akladios, M., Kortum, P., Wood, S.B., Himanga, J., Kozman, J., and Muddimer, A., "Geophysical Software Ergonomics: Objective Measures for Evaluation", 2009 Society of Exploration Geophysicists Annual Meeting, "Geophysical Software Ergonomics: Objective Measures for Evaluation" available on http://cltechconsulting.com/pdf2010/Abs_CompErgo_JK_2009.pdf.
Kozman, J. and Ripley, T., "Sustainable Spatial Architecture for Geo Engineering Data and Workflows", SPE Paper No. 116709-PP, prepared for presentation at the 2008 SPE Annual Technical Conference and Exhibition held in Denver, Colorado, USA, Sep. 21-24, 2008, 20 pages.
Kozman, J., and Hawtin, S., "The Main Sequence: Matching Data Management Change to the Organization", paper presented at the 2009 Petroleum Network and Education Conference 12th International Conference on Petroleum Data Integration, Information and Data Management, downloaded from http://cltechconsulting.com/pdf2010/PNEC12-paper0503_2_JBK.pdf, 6 pages.
Kozman, J., "Extraction to Injection—Using GIS for Carbon Sequestration", Presented at the 2010 Earth Sciences Research Institute (ESRI) Petroleum Users Group (PUG), Houston, Feb. 22-24, 2010. 11 pages. Available on http://cltechconsulting.com/pdf/PUGSlidesKoznianRel-8.pdf.
Kozman, J., "Enterprise Deployments of Model-Centric Workflows", Presented at: Petroleum Network Education Conference (PNEC) 13th Petroleum Integration, Information and Data Management Conference and Exhibit, May 12-14, 2009. 8 pages. Available on http://cltechconsulting.com/pdf/ModelCentricWorkflows-JBK0509Rel.pdf.
AAPG Can We Have It All? "Storing and Harvesting Massive Data Sets", available on http://www.aapg.org/explorer/2004/06jun/kozman.cfm, Jun. 6, 2004. 6 pages.
Kozman, J. "Case Studies of Hierarchical Knowledge Management for Large Datasets", AAPG International Conference, Barcelona, Spain, Sep. 21-24, 2003. Available from http://cltechconsulting.com/pdf/81539.pdf. 7 pages.
Mehrabian, A. and Kozman, J., "Value creation in the digital age: an information management approach", Australian Society of Exploration Geophysicists, ASEG Extended Abstracts 2004(1) 1-5. Available from http://www.publish.csiro.au/paper/ASEG2004ab098.htm.
Kozman, J.B.,"Seismically Incorrect: How Errors in Geophysical Data Affect Exploration Success", Presentation on the impact of spatial errors on geophysical data—Canadian SEG Geophysics 2002. 3 pages. Available on http:// cltechconsulting.com/pdf/KozmanSeismicallyIncorrect.pdf. 3 pages.
Kozman, JB, "Measuring the value of new technologies for New Zealand operators", 2004 New Zealand Petroleum Conference Proceedings • Mar. 7-10, 2004, 7 pages. Available on http://www.nzpam.govt.nz/cms/pdf-library/petroleum-conferences-1/2004/papers/Petroleum-23-04NZPC-Paper-NewTechNZOP.pdf.
Schlumberger Limited, Schlumberger Oilfield Glossary (excerpts) available at www.glossary.oilfield.slb.com (7 total pages).
Smith International, Inc.,"Drilling Assembly Handbook" (2001) (99 pages).

* cited by examiner

METHOD, SYSTEM AND APPARATUS FOR INTELLIGENT MANAGEMENT OF OIL AND GAS PLATFORM SURFACE EQUIPMENT

APPLICATIONS

This application claims the benefit of the filing date of and priority to U.S. Provisional Application Ser. No. 61/244,015 entitled "Method, System and Apparatus for Intelligent Management of Oil and Gas Platform Surface Equipment" and filed Sep. 18, 2009, Confirmation No. 5690. Said provisional application is incorporated by reference herein.

COPYRIGHT AUTHORIZATION UNDER 37 CFR 1.71

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable.

BACKGROUND OF THE INVENTION

Field of the Invention

The present invention relates generally to the monitoring and managing of equipment used in the oil and gas industry. The invention relates generally to offshore and onshore platforms and the standards to collect and use data to support decisions and knowledge management issues, where information technology is an enabler to facilitate the required change management to adopt such systems and consequent new work processes in the organization. More specifically, the present invention relates to a method, apparatus and system for the intelligent management of oil and gas offshore and onshore platform surface equipment over a computer network.

For offshore platforms and other facilities used in the oil and gas field, intelligent asset management must include proactive monitoring of surface equipment. Studies (Athens Group, 2009) show that up to 20% of the non-productive time (NPT) experienced by a deepwater rig can be the result of control system failures on drilling or production equipment. But similar failures can impact the fixed surface equipment on the rig floor that can also shut down drilling or production operations. Timely management of the complex, software-dependent control systems from multiple equipment vendors on the rig floor can therefore be a major determinant of productivity for intelligent oilfield implementations. The use of intelligent platform technology has already been proven for subsurface drilling and production data streams and has reached a competent level of capability maturity (Heiberger, 2009).

One such existing system is described in U.S. Pat. No. 7,584,165 to Buchan which pertains to an apparatus, system and method for facilitating decision-making in connection with management of enterprise assets disclosed. A real time expert decision support module is interfaced with an access portal including a navigation table for asset management, and with an historical parameter database associated with a distributed control system of plant end sensors and actuated control elements of a production process. The access portal and navigation table provide access to tools in the support module that facilitate real time decision making information delivery to the functional teams that support an asset, line of sight management performance models of team performance, practical performance analysis tools that extract information in real time from the process control system and other sources of asset data for translation into actionable information, and a real time interactive schematic environment.

The goal of information technology implementations in the oilfield industry is to improve productivity. While intelligent well and smart field technologies have made great strides in intelligent management of the reservoir (Oberwinkler and Stundner, 2005), the bottleneck for oilfield data flow up until now has been the transfer of real-time data to the engineers' desktop in a clean, timely, and useful fashion. Engineers typically have seen only a subset of data including daily production volumes and/or rates, along with isolated gauge pressures and temperature settings. Aggregating data from surface equipment provided by multiple manufacturers is still often a manual process on the rig floor (Eustes, 2007). With databases updated only periodically from real-time historians, production engineers and analysts have lacked sufficient insight into the dynamics of the platform and its impact on field operations, depending instead on general purpose tools such as spreadsheets to track production data and trying to make inferences about relationships to equipment performance. This type of point solution is one of the indicators of a low level of data management maturity for equipment data compared to other data streams in the industry (Kozman and Ripley, 2008).

Downtime on offshore production platforms cost the industry billions every year. Until recently, there have not been common integrated architectures to collect information from multiple systems, or present them in a global common interface to prevent costly and unwarranted downtime. With today's nonproductive downtime estimated at 20%, it is desired to have a software solution that will reduce facility downtime and increase production. It is also desirable to provide predictive actionable information of systems capabilities that will reduce downtime and save the oil & gas industry billions in lost production time. By 2010, many new oil and gas facilities/assets will be located in more challenging geographical and geopolitical environments. These facilities/assets are likely to account for about 40% of production volumes worldwide, increasing from approximately 25% in 2005.

As such, there exists a need to provide an intelligent platform system that can address the needs of the offshore rig surface equipment environment, including, the need to reduce equipment downtime and personnel-on-board (POB) requirements while increasing reliability, safety, regulatory compliance and environmental responsibility. There also exists a need provide a system for the remote monitoring and predictive analysis for surface equipment on offshore platforms and to provide a solution that correlates and analyzes the relationships between all of the offshore platform surface assets by monitoring, predicting, and providing critical data in an informative format to allow for quick decision making from anywhere in the world thereby also lowering operating costs and reducing downtime. Delivering predictive actionable information of systems capabilities will reduce downtime and save the oil & gas industry billions in lost production time. Stopping the event before it happens, by understanding the cause and predicting the failure will be an invaluable asset for decision makers operating and managing offshore surface equipment.

What is needed in order to properly evaluate, manage and mitigate the impact of equipment downtime on production is an alarm system to inform instrument and control engineers of under-performing or critical conditions on equipment before it begins to degrade production and the revenue stream. Oilfield operations need to move beyond the familiar data management mantra of the "right data to the right person at the right time" and adopt the 21st century goal of "validated data, to the decision maker, before the critical event" (Kozman, 2004). The new technology applied in the I-Platform System ("IPS") implementation delivers the solution needed to attain this goal and bring equipment data monitoring to the same level of capability maturity currently deployed for downhole production data. Aggregating, analyzing, and delivering real-time equipment data across a global secured network enables local, remote, and external participants in a distributed pool of global machinery expertise to collaborate and optimize facility efficiency and energy consumption based on common views of equipment performance, data streams, alarms, and notifications.

Implementation of an I-Platform system solution for offshore rig surface equipment assets requires defining operating envelopes that optimize equipment usage for costs and efficiencies, allowing early identification and intervention for pending equipment outages and enabling root-cause failure analysis that takes into account multiple environmental factors. The I-Platform system solution applies best practices derived from numerous digital oilfield case studies to fixed surface equipment in order to reduce NPT. This solution is an end-to-end implementation for surface equipment that brings together mission-critical capabilities developed and already being deployed for downhole operations. It utilizes unique data analysis tools with artificial intelligence algorithms for codifying existing equipment expertise into business rules such as neural networks and self-organizing maps. Results of the data mining and analysis are delivered in a role-based and easily configurable visual dashboard for multiple aggregated data streams.

A recent prototype installation utilizes data streams from a major offshore drilling contractor with a versatile fleet of mobile offshore drilling units and an operational performance center at a leading oilfield service company to demonstrate the viability of this approach for both offshore and remote onshore operations. The success of this proof of concept demonstrates that disparate data from multiple equipment vendors can be gathered from remote locations, analyzed and distilled into actionable items, and displayed in order to support proactive decisions by a distributed pool of subject matter experts.

BRIEF SUMMARY OF INVENTION

One embodiment of the present invention pertains to a computer implemented method for predictive analysis of surface equipment or systems used on one or more oil and gas field platforms located offshore or onshore comprising the steps of: Inputting to a data aggregator on a computer system real-time data streams from one or more sensors sensing parameters of interest on surface equipment located on one or more platforms, such surface equipment containing one or more sensors for monitoring in real time the performance of such surface equipment based on such parameters of interest; Aggregating such sensor data into a common data format; Transmitting the aggregated, formatted sensor data to a computerized data analysis engine; Inputting into the data analysis engine multiple data streams containing information relevant to the operating equipment or systems; Providing a neural network within the data analysis engine; Generating self organizing maps within the data analysis engine; Generating status indicators in real-time relevant to the operation of the equipment or systems; Using the neural network engine to transform the equipment data streams from a monitoring state, function or use to a predictive state, function or use; Transmitting such status indicators to one or more end users over a network; and Providing a computer-based dashboard software-based display system for displaying to such end user(s) such transmitted data. In another embodiment of this method, the method further comprises the step of training the neural network to cross-correlate the multiple data streams and look for relationships between the incoming data streams. In yet another embodiment, the multiple data streams comprise manufacturer's operational parameters for the equipment and systems and historical performance data obtained from monitoring the actual operation of a piece of equipment in different operating environments. In one embodiment of the present invention, the neural network is trained to cross-correlate the real-time sensor data and the manufacturer's operational parameters and look for relationships between the incoming data streams. In yet another embodiment of this method, the neural network is operated in an untrained mode.

Another embodiment of this method comprising the additional step of deriving functions from the data streams using the neural network, wherein the functions are both continuous and differentiable. An additional step may include deriving errors by comparing the input data streams with the predictive states from the neural network. The derived errors may be used to train the neural network.

Yet another embodiment of this method comprises the additional steps of: providing a cascade-forward back-propagation network, having multiple layers, within the data analysis engine; inputting the data streams directly into each layer of the cascade-forward back-propagation network; and using higher-order polynomials within the cascade-forward back-propagation network to model nonlinear relationships among the data streams. This method may also further comprise the step of using the predictive states to limit the data streams input into the cascade-forward back-propagation network by eliminating data points that fall outside of the errors. An additional step may include comparing the predictive state to the input data stream for use in generating status indicators.

Another embodiment of the present invention pertains to a system for remotely predicting the performance of surface equipment and systems used on one or more oil and gas field platforms located offshore or onshore comprising: (a) a data aggregator for gathering real-time data streams from surface equipment located on such one or more platforms, such surface equipment containing one or more sensors for monitoring in real time the performance of operational parameters of interest in such surface equipment; (b) a data analysis engine in network communication with the data aggregator, the data analysis engine comprising a neural network capable of generating self organizing maps, and creating predictive operational indicators regarding such surface equipment and systems; (c) an interface for inputting into the neural network multiple data streams containing information relevant to the operating equipment or systems; (d) a network user interface for transmitting such predictive operational indicators from the data analysis engine to one or more end user terminals equipped with end user dashboard display software and (e) an interface for inputting sensor data to the data aggregator.

This system may further comprise a cascade-forward back-propagation network, having multiple layers, within the data analysis engine and an interface for inputting the data streams directly into each layer of the cascade-forward back-propagation network.

Another embodiment of the present invention pertains to a computer program product, comprising a computer usable medium having a computer readable program code embodied therein, said computer readable program code adapted to be executed to implement a method for the training of a neural network used to generate predictive operational parameters for surface equipment and systems used on oil and gas platforms, said method comprising: providing a system, wherein the system comprises distinct software modules, and wherein the distinct software modules comprise a data input module (to provide instruction to a user to identify and parse multiple digital data streams containing information relevant to the operating equipment or systems), a data formatting module (to correlate, time synchronize and standardize the digital data streams) and a data loading module (to identify and transmit the data streams as training data to the neural network).

DETAILED DESCRIPTION OF THE INVENTION

Figure 1A:
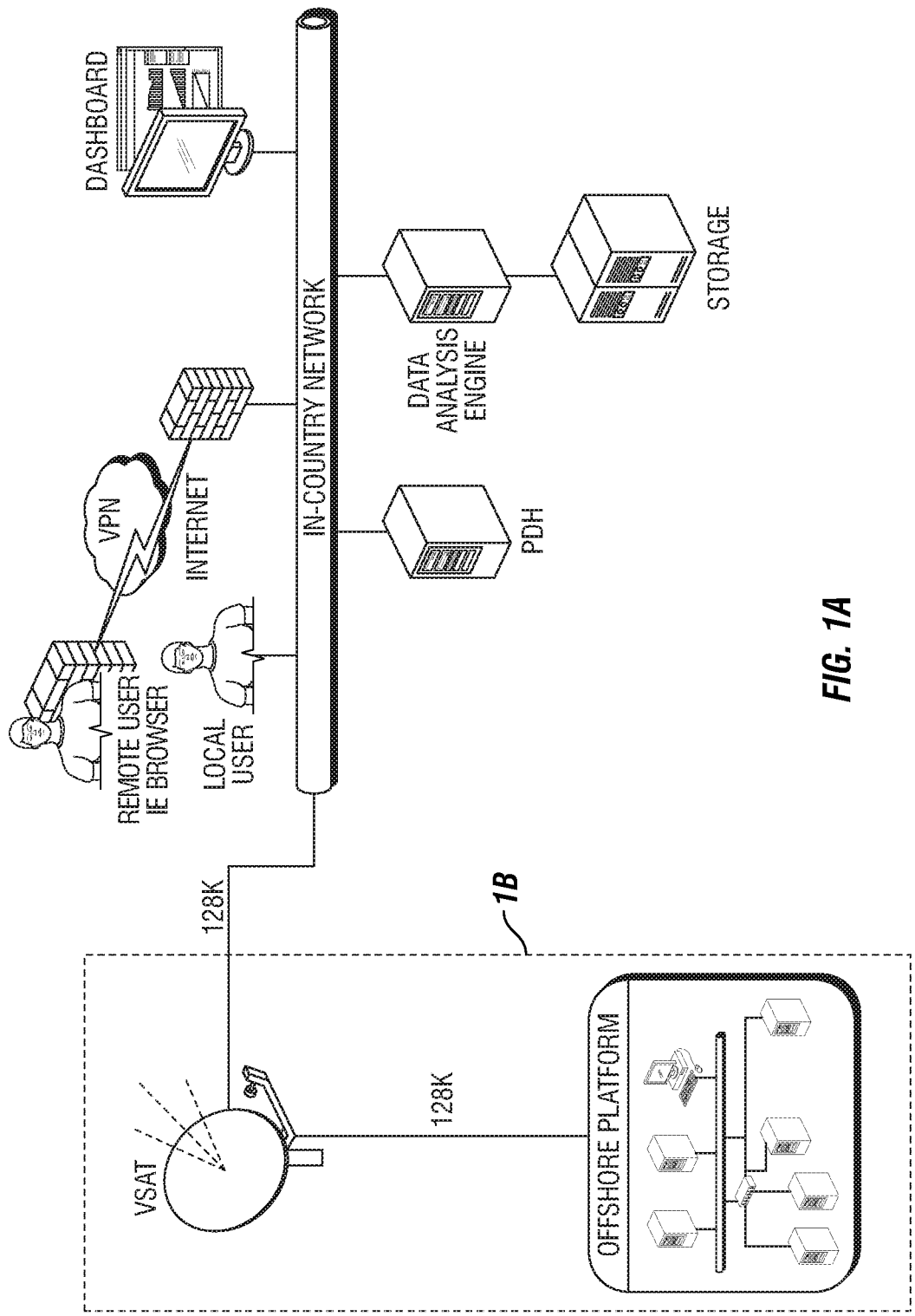
FIG. 1A presents a schematic view of on-shore infrastructure for the I-Platform system of the present invention.

In upstream oil and gas operations, the most obvious measure of increased efficiency would be Barrels of Oil per Day (BOPD). Yet it has traditionally been difficult to correlate the use of advanced technologies with increased productivity over the short time frames in which daily production is analyzed (Brynjolfsson, 2003). With the advent of digital oilfield initiatives however, and the dedication of major oil companies to long-term projects (Feineman, 2009), the opportunity now exists to implement and measure the benefits of equipment monitoring over a long term. Recent surveys (Microsoft, 2008) indicate that the majority of oil and gas geotechnical personnel could reduce their project risk with access to more computing power and technology. As new IT capabilities originally developed for downhole monitoring are adapted to topside workflows, they are contributing directly to reduced downtime on offshore rigs. Applied to offshore condition monitoring of equipment and assets, this set of capabilities is defined as an "Intelligent Platform" or I-Platform.

The I-Platform system of the present invention has been developed to aggregate, analyze and deliver data streams from all multiple and disparate equipment subsystems located at offshore assets to meet the above objectives, utilizing commercial off-the-shelf (COTS) software and industry-standard bandwidth and delivery systems. Currently there is nothing on the market that performs this function. Diverse data sources represented by supervisory control and data acquisition (SCADA) "tags" from multiple vendor's topside equipment are brought onto a single bus by means of a multilevel, secure local area network (LAN). Pattern recognition and automated data analysis are applied using business rules derived from global domain expertise to determine the subset of potential data streams which contain actionable data. The neural network engine in combination with physical models can be used to transform multiple monitored and alarmed data streams into observable and verifiable predictive data streams that allow for optimized operations of rotating and reciprocating equipment on the rig floor provided by differing manufacturers. Common views of equipment performance, alarms, and notifications against key performance indicators (KPIs or KPIS) are then delivered via a Web-enabled, role-based and user-configurable operator dashboard. The use of advanced Web technologies such as service oriented architecture (SOA) means that these displays can be accessed from any remote location and have the ability to aggregate data from similar equipment even when that machinery is deployed across multiple and dispersed geographic locations. This allows comparison of equipment performance in the context of operating conditions such as operating cycles, climate, sea states, or rig state. Unfortunately, practices around this type of data stream often follow the example of scientific drilling (Cohen et. al., 2007) and vital correlations can only be examined after a drilling campaign is complete. This severely limits the applicability to preventative maintenance issues. The I-Platform system of the present invention in contrast can provide this information in real-time to support decisions.

On offshore platforms, this type of asset management including the monitoring and maintenance of equipment can be a major determinant of productivity. A primary goal of the I-Platform system of the present invention is to reduce surface equipment downtime and increase reliability. It can contribute to this goal by enabling the definition of operating envelopes that optimize equipment use, allowing early identification of pending equipment wear-out and enabling root-cause failure analysis. The resulting productivity gain is recognized in facility cost reductions, enhanced system availability, reduced manpower or POB (Personnel On Board) requirements, reduction in operating downtime and improved QHSE performance in platform operations. For operators, this means the capability to leverage a small pool of centrally located Subject Matter Experts to maintain a large and geographically distributed fleet. For rig providers, it can mean the difference between building scheduled preventative maintenance into a rental contract instead of paying for unscheduled downtime. At today's rig rates, the payout for this competitive advantage realized through software implementation can be a matter of hours (Shafer, 2005).

Offshore oil & gas, as a globally dispersed environment, has traditionally presented special challenges to the implementation of global IT solutions. But advances in network, computing, and software technologies have made it possible to address these challenges and make the I-Platform system a reality today. Operational awareness for producing assets is improved with multiple sources of different data types integrated in a strategic view of key performance indicators.

Like many IT solutions, the effectiveness of the I-Platform system of the present invention rests on its ability to correlate data from a range of diverse sources, and provide a global level of aggregation and analysis beyond what is typically derived from supervisory control and data acquisition (SCADA) systems. Information is brought from the operating asset to onshore engineering workstations where it is combined with data derived from equipment models, engineering analyses, and business systems. Advanced tools such as neural networks, cascade-forward back-propagation networks (also referred to as cascade-forward backpropagation networks), self-organizing maps, or other artificial intelligence technologies are used to evaluate equipment sensor readings against performance envelopes or thresholds developed from predictive algorithms. Actionable items are then displayed to a user-configurable, web enabled dashboard with drill-down and aggregate-up capabilities for data analytics.

Application

The Intelligent Platform or I-Platform system of the present invention will support facility cost reductions, enhanced system availability, reduced personnel requirements, and improved safety for offshore asset operation. The data analysis engine will support decisions regarding period extensions between equipment overhauls or rapid identification of fixed equipment fouling in remote locations, and ultimately reduce downtime and improve the predictability of maintenance time windows for rig operators, drilling and production personnel.

This method of achieving the I-Platform system vision utilizes a combination of available commercial hardware and software technologies, a powerful collaboration based on expertise in information technology and the petroleum industry. It is an integrated solution that connects equipment sensors onto a common infrastructure, to aggregate and analyze data as it is received, analyze it against pre-determined or ad-hoc businesses rules and deliver it efficiently to onshore personnel. Given the growing scarcity of expert resources in the petroleum industry, its global nature, and emphasis on wide-ranging and transient partnerships, the I-Platform system must first and foremost deliver information access to a wide range of parties vitally interested in the pursuit of productivity goals. The loss of subject matter experts to declining demographics in the oilfield and operations in both geologically and geo-politically hazardous areas adds to the pressures on technology systems, while the requirement for data in "real time" is now accepted in oilfield operations (Wood, 2007).

Within the I-Platform solution, an operation is considered real time if the combined operation and reaction time of a task is shorter than the maximum delay allowed within the larger dynamic system. This is sometimes referred to in the oilfield as "relevant time" and can involve short (seconds to minutes), medium (hours to days) and long term (months to years) data loops depending on the dynamics of the data streams involved. With its focus on top-side equipment monitoring, the I-Platform system leverages ongoing performance breakthroughs in technologies currently used to optimize well production and performance through better information management in all of these time frames. The I-Platform system of the present invention is unique from other data aggregation systems in that it employs not only data delivery but unique capabilities for data mining and conditioning. The capability and utility of artificial intelligence techniques such as neural networks and self-organizing maps has already been demonstrated in production performance monitoring (Stundner and Nunez, 2006). The I-Platform system of the present invention applies these techniques to global topside equipment monitoring in an enterprise solution.

Referring to FIG. 1A, there is shown a schematic view of on-shore infrastructure for the I-Platform system of the present invention. FIG. 1A shows the various types of information required by the end user (customer) or the subject matter experts to understand the problem coming from, e.g., a particular platform/rig (1B), its cause, and either how to fix it with the appropriate persons or eliminate future failures. This information comes from a data analysis engine that contains the predictive analytic software and neural networks (and also as may be desired, cascade-forward back-propagation networks). Operating information about platform surface equipment is transmitted from a platform data historian or data aggregator located on the platform via a communications network (e.g., VSAT) to an in-country network (e.g., LAN/WAN). If desired, the data from the platform data historian/data aggregator can be mirrored or replicated on a PDH located within the in-country LAN/WAN network. Likewise, if desired, all of the information on the data analysis engine can be stored in a storage device or SAN. As shown in FIG. 1A, one or more local end users can access the information from the data analysis engine via display on a dashboard display. Likewise, remote users can access such information via a secured network access so that such information can be displayed in their remote location on a dashboard display. Access to such information can ultimately be governed by the end user (customer) who can limit access through their protocol. FIG. 1A shows one exemplary way in which such information can be delivered to the desired end users.

Figure 1B:
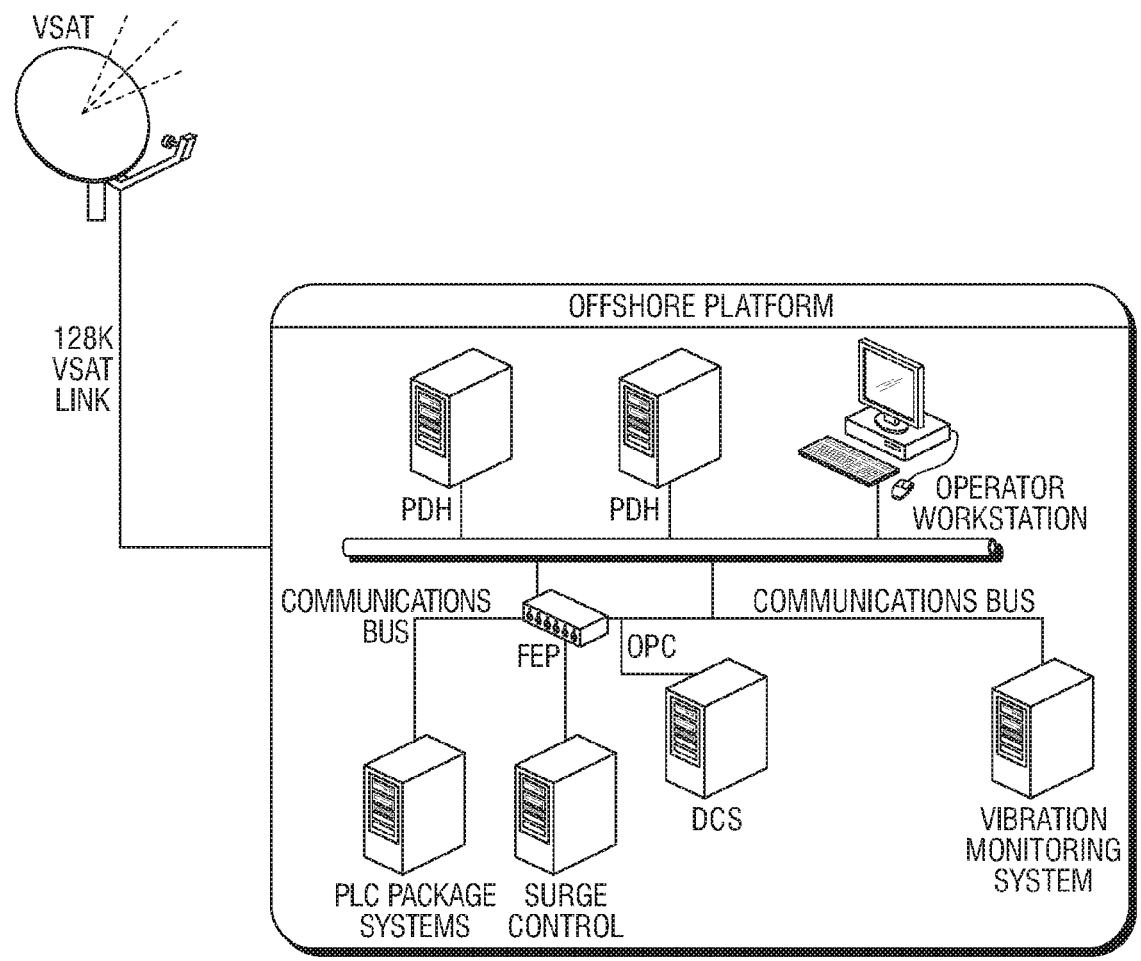
FIG. 1B presents a schematic view of platform/rig infrastructure for the I-Platform system of the present invention.

Referring now to FIG. 1B, there is shown a schematic view of platform/rig infrastructure for the I-Platform system of the present invention. FIG. 1B represents the collection, via communications network, of raw data from all/any surface equipment or systems located on a given platform. The raw data is communicated to one or more platform data historians (PDH) (also referred to as data aggregators) located on a communications network. One PDH can serve as the primary raw data collector while another, if desired, could serve as a back-up. The one or more PDH are linked into a robust communications network. It is preferred to collect raw data from all equipment and systems on the platform, for example but not limited to, the vibration monitoring system, the data control system (DCS), the surge control, the package systems, blow out preventer systems, power generation and emissions control systems, ballast control and mooring systems, thruster control, subsea flow lines and umbilicals and any PLC. In one example of a communications network used on the platform, one or more FEP may be employed to process the data prior to the data being transmitted to the PDH(s). In another example, it may not be necessary to employ an FEP. An operator workstation could be provided on the platform to permit, as may be desired, a local operator on the platform to gain access to the same information that an end user has access to via the data analysis engine information displayed on a dashboard terminal (FIG. 1A).

Figure 1C:
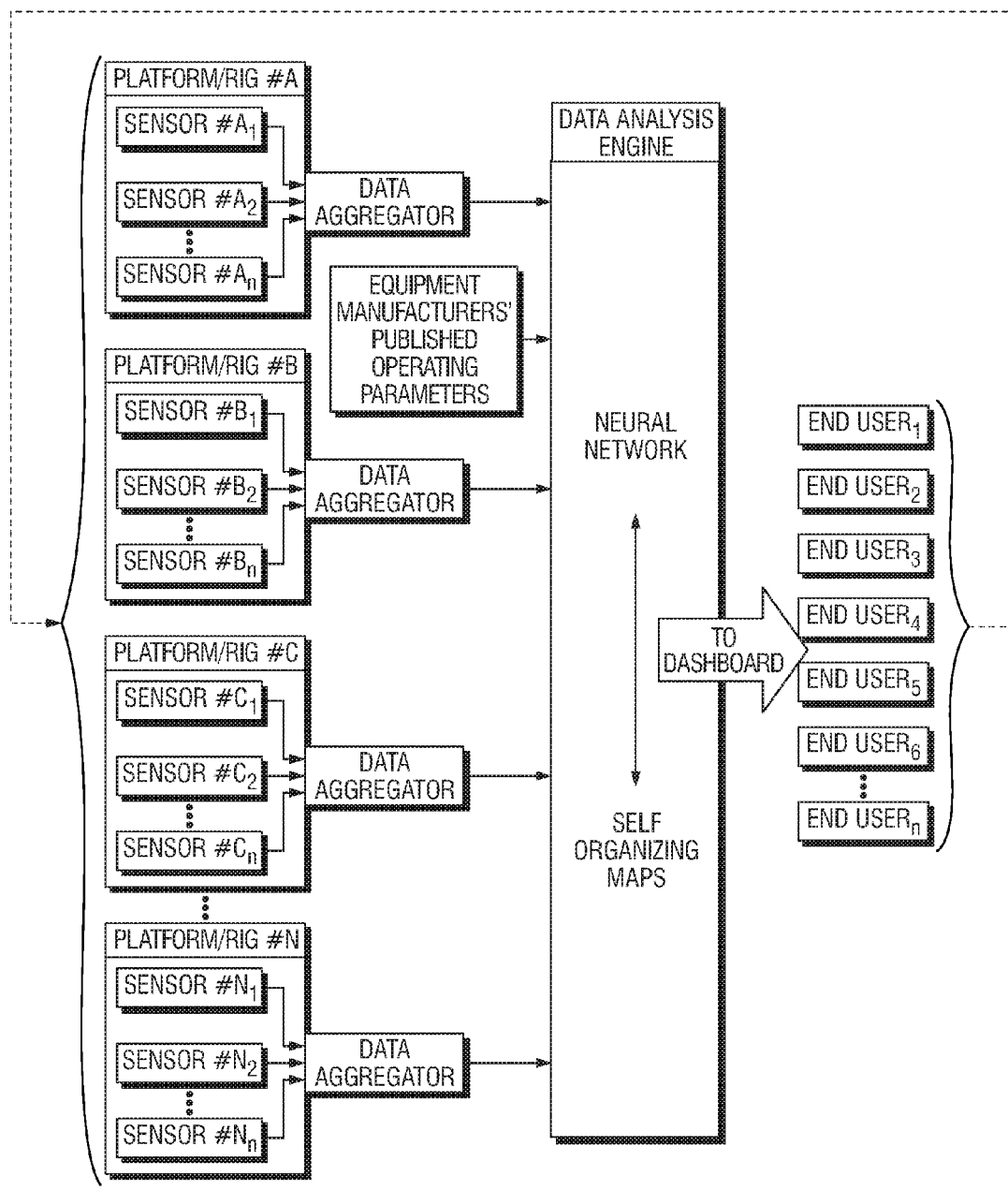
FIG. 1C presents a schematic overview of I-Platform system of the present invention.

FIG. 1C presents a schematic overview of the I-Platform system of the present invention. Individual sensor date from any number of systems or equipment located on a platform is aggregated into a data aggregator or PDH located on the platform. Any number of platforms can be monitored in this manner. The data aggregators (PDH) from each platform are then fed (via communications network) into a data analysis engine typically located remote to the platform. The data analysis engine contains a neural network to create self organizing maps. The neural network receives global operation real-time data input from each sensor in the network regarding the actual operation of the parameter being monitored by the sensor. The manufacturers' published operating parameters for each piece of equipment or system in the network is also fed into the neural network along with other various types of knowledge or information so that the neural network can analyze and cross-correlate such data as it creates and updates Self Organizing Maps (SOM). The SOMs can then be used to direct important operational signals, KPIs, root causes, predictive information and alerts to one or more end users in a communications network (via display on an end user dashboard). A feedback and control loop can be used to permit the end user to provide feedback directly back to the piece of equipment or system in question (or the operators thereof) to resolve any issue. The end user can also, as may be desired, probe historical stored data relevant to the issue at hand or the equipment and systems in use.

The data analysis engine may also contain a cascade-forward back-propagation network, having multiple layers. Equipment data streams can be input directly into each layer of the cascade-forward back-propagation network. Higher-order polynomials within the cascade-forward back-propagation network may be employed to model nonlinear relationships among the data streams. The neural network can be used to derive functions from the data stream, wherein the functions are both continuous and differentiable. Error may be derived by comparing the input equipment data streams with the predictive states generated from the neural network. The predictive states can be used to limit the data streams input into the cascade-forward back-propagation network by eliminating data points that fall outside of the error. A comparison of the predictive state to the input data stream can then be used in generating status indicators to advise an end user whether the equipment is or is not performing as predicted.

Figure 2A:
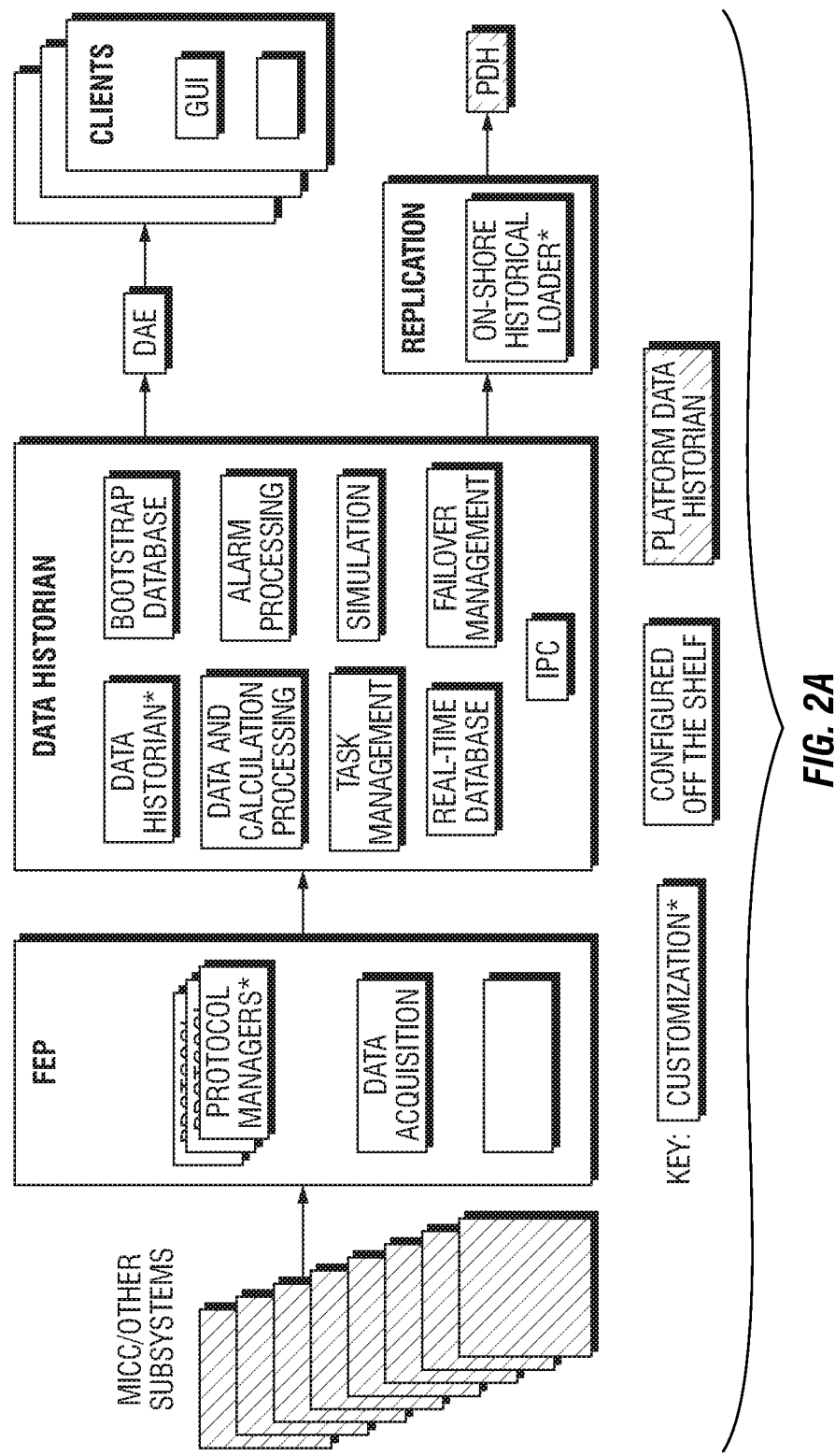
FIG. 2A presents a schematic view of system architecture for the I-Platform system of the present invention.

FIG. 2A presents a schematic view of system architecture for the I-Platform system of the present invention. For example, raw sensor data from equipment and systems (such as various Mechanical Instrument & Control Contractors ("MICC") Subsystems (and other subsystems)) is communicated to a platform data historian via, e.g., a front end processor ("FEP"). The FEP accomplishes the data acquisition and includes Protocol Managers (that can be customized). The Data Historian includes an intelligent process controller (IPC) to handle bootstrap database, data and calculation processing, alarm processing, task management, simulation, real-time database and failover management. The data historian can be customized to filter the required and/or selected data sets or data streams prior to sending them onto the Data Analysis Engine (DAE). The data historian outputs to a DAE and then from the DAE to the graphical user interface (GUI) (also referred to as the end user dashboard), and also, if desired, to a replication device located in an on-shore or other location to serve as a backup platform data historian (PDH).

Figure 2B:
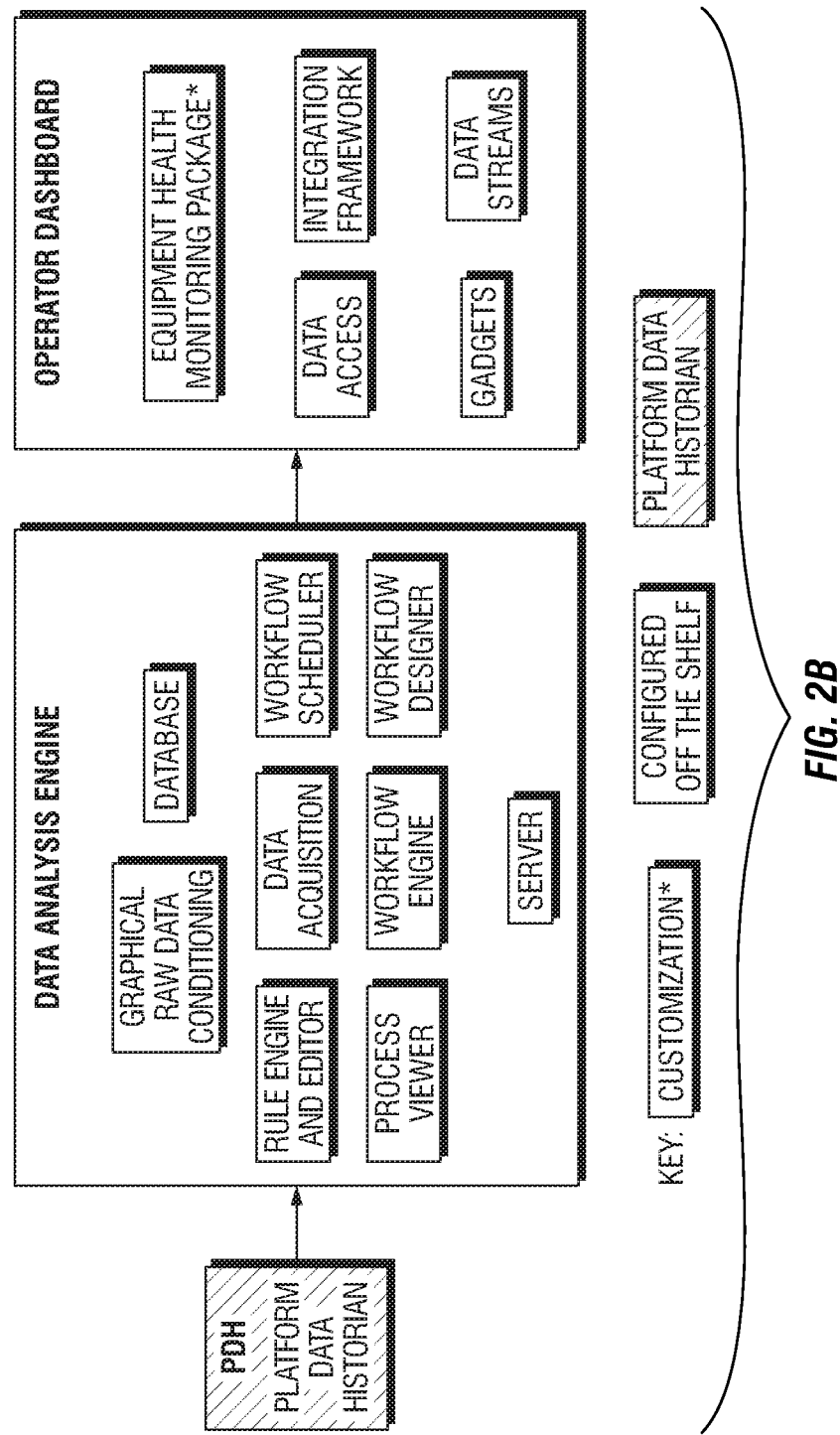
FIG. 2B presents a schematic view of data analysis engine and operator dashboard architecture for the I-Platform system of the present invention.

FIG. 2B presents a schematic view of data analysis engine and operator dashboard architecture for the I-Platform system of the present invention. The Data Aggregator (or PDH) is linked in communication to the Data Analysis Engine (DAE). Typically, the Data Analysis Engine is located on-shore at a convenient base location for the operator. The Data Aggregator is linked to the Data Analysis Engine via telecommunications links, wireless communications technology, satellite technology (e.g., VSAT) and the like (including hardwire if feasible). The DAE includes graphical raw data conditioning, a database, a rule engine and editor, data acquisition, workflow scheduler, process viewer, workflow engine, workflow designer, and a server. The Data Analysis Engine also utilizes Neural Networks (NN) and Self Organizing Maps (SOM). The output from the DAE is directed, via communications network, to the operator dashboard. Within this dashboard can be a series or package of screen views directed to assisting the end user (equipment health monitoring package), as well as providing the end user with data access, an integrated framework of data across the network of equipment and systems being monitored and other data streams, as well as other user friendly gadgets or applets for e.g., displaying the KPIs on the web.

Figure 3:
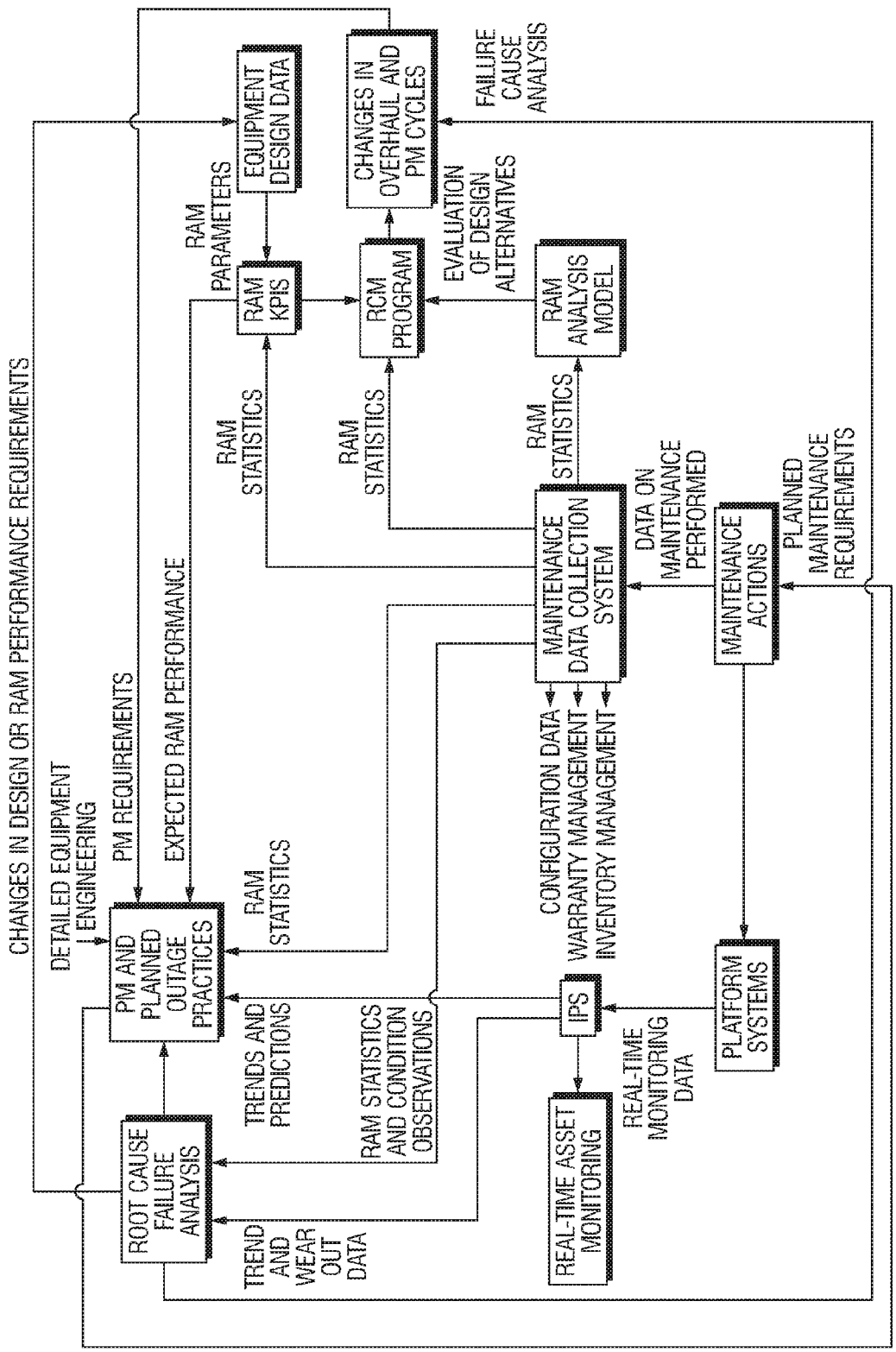
FIG. 3 presents a schematic flow diagram of process and feedback loops internal to the data analysis engine of the present invention.

FIG. 3 presents a schematic flow diagram of processes and feedback loops internal to the data analysis engine, used to cross-correlate the various diverse raw data and tailored to the predictive analysis of the various surface assets in question according to the I-Platform System ("IPS") invention of the present invention.

The I-Platform method, system and apparatus of the present invention utilize three main components: (1) a Data Aggregator—"DA" (or Platform Data Historian—"PDH"); (2) a Data Analysis Engine—"DAE; and (3) a user interface Dashboard. Generally speaking, the Data Aggregator gathers real-time data streams from multiple surface equipment (of varying vendor source) located on offshore or onshore platforms. This surface equipment contains various real-time sensors that generate raw data in real time relating to the performance of that piece of equipment. These diverse sensors (from one or more pieces of topside equipment located on one or more platforms located throughout the world) often are already interfaced with a data historian. These SCADA "tags" from multiple vendors' topside equipment are brought onto a single bus by means of a multilevel, secure local area network (LAN). The raw data output from each piece of equipment on a given platform/rig is interfaced via a programmable logic control (PLC) interface into the Data Aggregator (which is typically located on that particular platform/rig). If a sensor from a given piece of equipment is already interfaced into a data historian, then that data historian is then interfaced directly with the Data Aggregator. The Data Aggregator can be COTS or customized. Two important functions of the Data Aggregator (or PDH) are to ensure that (a) the data from each sensor is being time-stamped and that the correct time interval for data capture is being employed for each specific sensor, and (b) that the raw data streams from each sensor are being synchronized so that from a protocol management standpoint, all of the various raw data streams are being placed into a common format.

The Data Aggregator (or PDH) is linked to the Data Analysis Engine (DAE). Typically, the Data Analysis Engine is located on-shore at a convenient base location for the operator. The Data Aggregator is linked to the Data Analysis Engine via telecommunications links, wireless communications technology, satellite technology (e.g., VSAT) and the like (including hardwire if feasible). The DAE includes graphical raw data conditioning, a database, a rule engine and editor, data acquisition, workflow scheduler, process viewer, workflow engine, workflow designer, and a server. The Data Analysis Engine utilizes Neural Networks (NN) and Self Organizing Maps (SOM). The DAE looks for relationships between the incoming data streams, and the NN is trained specifically to do this. The NN training data comes from a number of sources, such as, data from equipment manufacturers regarding the published operational parameters for a specific piece of equipment—in other words, data regarding how a piece of equipment should operate, and actual performance data obtained from monitoring the actual operation of a piece of equipment in different operating environments. NN Training data can come from the manuals for the various Mechanical Instrument & Control Contractors ("MICC") Subsystems (and other subsystems).

To effectively train the Neural Network, the NN receives input from the two primary sources noted above (as well as other sources): equipment manufacturers' operational information, and the actual performance data from the piece of equipment while in use. The NN is trained to create SOM in an SOM engine. The NN/SOM relationship is well known in the art. The result of the SOM is a set of optimized performance parameters, such as, alarms, thresholds, alerts, etc. The object of creating the SOM is to identify relationships between the data streams that are not known to the operator of the equipment. This is done by allowing the SOM engine to operate in an untrained mode. For example, a particular compressor on the surface of an offshore platform in an arctic environment may require a different maintenance schedule than an identical compressor on a platform in a tropical environment. As such, performance data from such diversely located pieces of equipment can teach the NN/SOM to generate new relationships as this diverse data (sometimes thought to be unrelated to each other) comes in. On a given offshore platform, the list of available data streams (input parameters) coming from equipment sensor tags could easily be between, e.g., 1,000 and 10,000. Each tag represents a single sensor on a single piece of equipment monitoring a single parameter. As such, given the diverse pieces of equipment on each platform (many different manufacturers), the diverse geographical location of each platform using such equipment, and the extraordinarily large volume of sensor data associated with a single platform or a world-wide network of platforms, the NN/SOM relational real-time data becomes a critical resource for an operator overseeing one or more such platforms.

Another embodiment of the method disclosed herein uses the historical data streams in a cascade-forward back-propagation network with multiple layers and the original input data fed directly into each layer of the network, allowing the network to model nonlinear relationships using higher-order polynomials. All functions used in the network are both continuous and differentiable and the error between the actual and expected results can be used to train the network. The use of the neural network to meaningfully limit the execution of the back-propagation steps describes a tangible solution to the problem of unanticipated downtime when the observable and verifiable results of the predictive analysis are compared to actual operating parameters.

SOM Data from the DAE is then delivered to the end user(s) via a web-based user interface or dashboard. The data delivery from the DAE to the end user can be via any appropriate technology, such as, over a network, via telecommunications, intranet, internet, etc. This user dashboard can be customized software or a COTS version, such as the Bablefish™ software sold through Schlumberger, or other dashboard software such as the iStore software, Wonder Ware software, or Oilfield Commander (OFC) software. The basic components of the dashboard/user interface are to provide visual display of Key Performance Indicators (KPIs) which permit the end user to drill down to the component/sensor level as necessary, or to aggregate up for a global view to look at performance across multiple platforms/rigs in the same and/or different geographical areas. An operator dashboard is important for its roles-based view of client-specific maintenance and reliability KPIs, based on domain expertise collected during the concept of operations/site assessment. By tapping into the expertise of the aforementioned pool of global machinery expertise, KPIs are made to reference facility efficiency and energy consumption metrics or display equipment maintenance parameters within defined operating envelopes.

One exemplary currently available (COTS) dashboard software system that could be employed within the present invention is the system called "Avocet Surveillance" offered by Schlumberger Information Solutions, an operating unit of Schlumberger, and described more fully in the materials available on Schlumberger's website: www.slb.com/content/services/software/production/avocetsurveillance.asp. More particularly, according to Schlumberger's technical overview, the "Avocet Surveillance" system (which is powered by BabelFish™ software technology) is an integrated framework that enables optimal insight into oil and gas production operation performance to give production engineers and managers immediate access to actionable information. This system provides real-time surveillance and collaboration for producing assets. Engineers and managers in the field or in the office can customize and extract the information required to monitor and manage production operations, enabling development of effective strategies for intelligent and efficient oilfield production operations. This Schlumberger software is powered by BabelFish™ technology, enabling data integration, visualization, and collaboration capabilities to support standard and advanced upstream production workflows and processes, production operation centers, and enhanced asset awareness solutions for today's digital oilfield environment. This Schlumberger software provides integrated graphical access to all production and operational data over the Web. The software reads "tags" (i.e., tag name, date-time, and value) from external data sources such as historians, allowing the user to add context and store the contextual tags in a data dictionary. This integrates the inputs and outputs of detailed production engineering workflows from other of Schlumberger's "Avocet Family of Products", along with third-party technologies, providing a collaborative platform for visualization and analysis of production operations. A flexible interface and drag-and-drop capabilities allow users to rapidly build and deploy standard or customized workflows and surveillance processes for their particular producing assets with minimum training. See, http://www.slb.com/media/services/software/production/avocetsurveillance.pdf. As such, a dashboard of this type is well-suited for use as a dashboard software for the present invention.

Figure 4A:
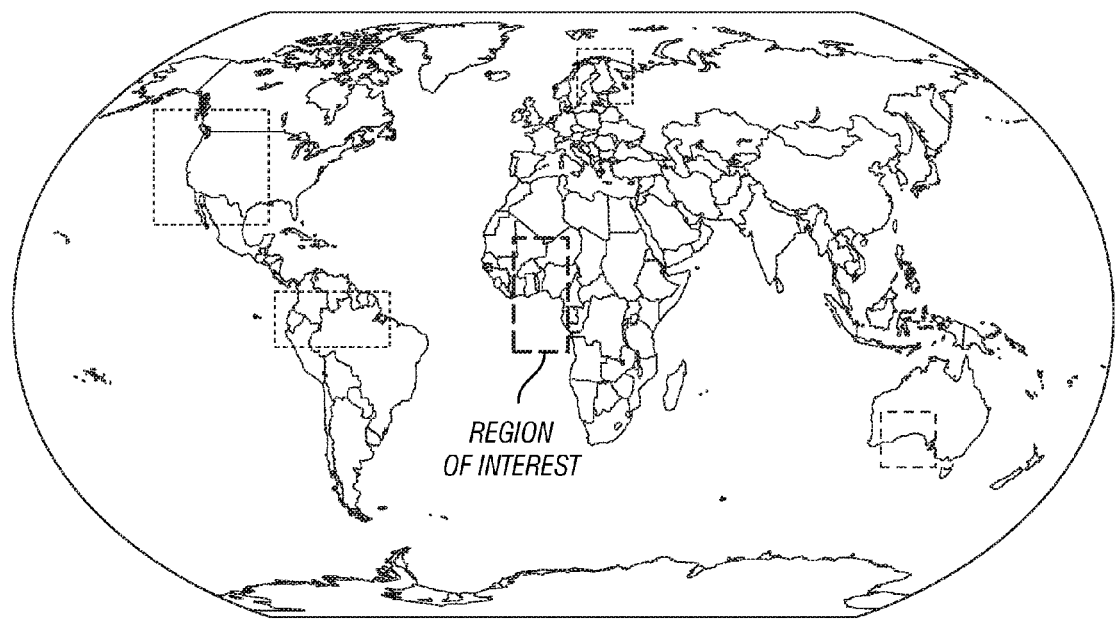
FIG. 4A presents an example end user dashboard screenshot of a world or global view of platforms of interest containing equipment monitored using the predictive analysis system of the present invention.
Figure 4B:
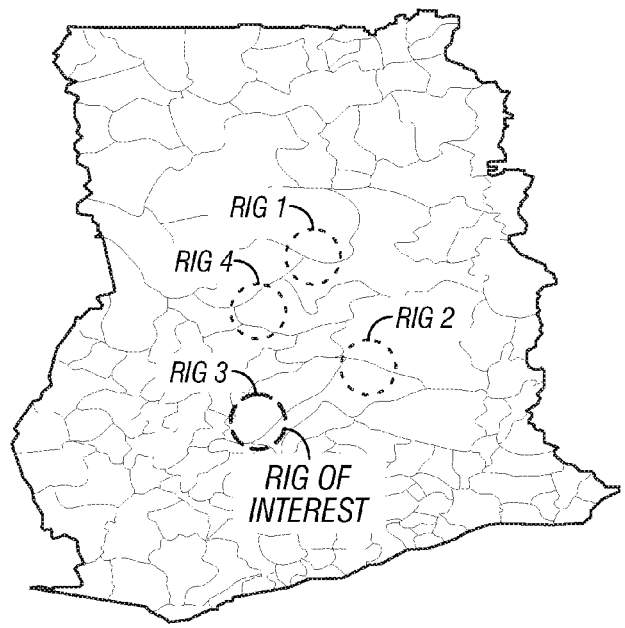
FIG. 4B presents an example end user dashboard screenshot of a basin view of platforms of interest containing equipment monitored using the predictive analysis system of the present invention.

Referring now to FIGS. 4A-E, there are shown sample screenshots from an example software-driven dashboard used to display the real-time predictive intelligence to one or more end users. FIGS. 4A-E illustrate a dashboard example and drill-down from global view. Specifically, FIG. 4A shows a dashboard screen-shot example showing a world or global view of platform locations as may be displayed via the dashboard software. In this FIG. 4A, based on real-time sensor data as processed with the present invention, there is displayed a Region of Interest (which could be highlighted with a different color or other attention getting display) showing the end user(s) the geographical area requiring attention. Drilling down from this Region of Interest, e.g., by clicking on the Region of Interest, there is depicted in FIG. 4B a Basin View showing one or more platforms/rigs that are found within such Basin within such Region of Interest. Among the rigs/platforms depicted could be one or more of a Rig of Interest (such as Rig #3 depicted by a red graphical circle or the like) indicating the specific rig requiring end user attention. The remaining rigs (#1, #2 and #4) within the basin can be marked with green circles indicating visually an acceptable operational status. The end user(s) can then click on the Rig of Interest to a screen shot view of the actual rig/platform, such as the Rig View depicted in FIG. 4C.

Figure 4C:
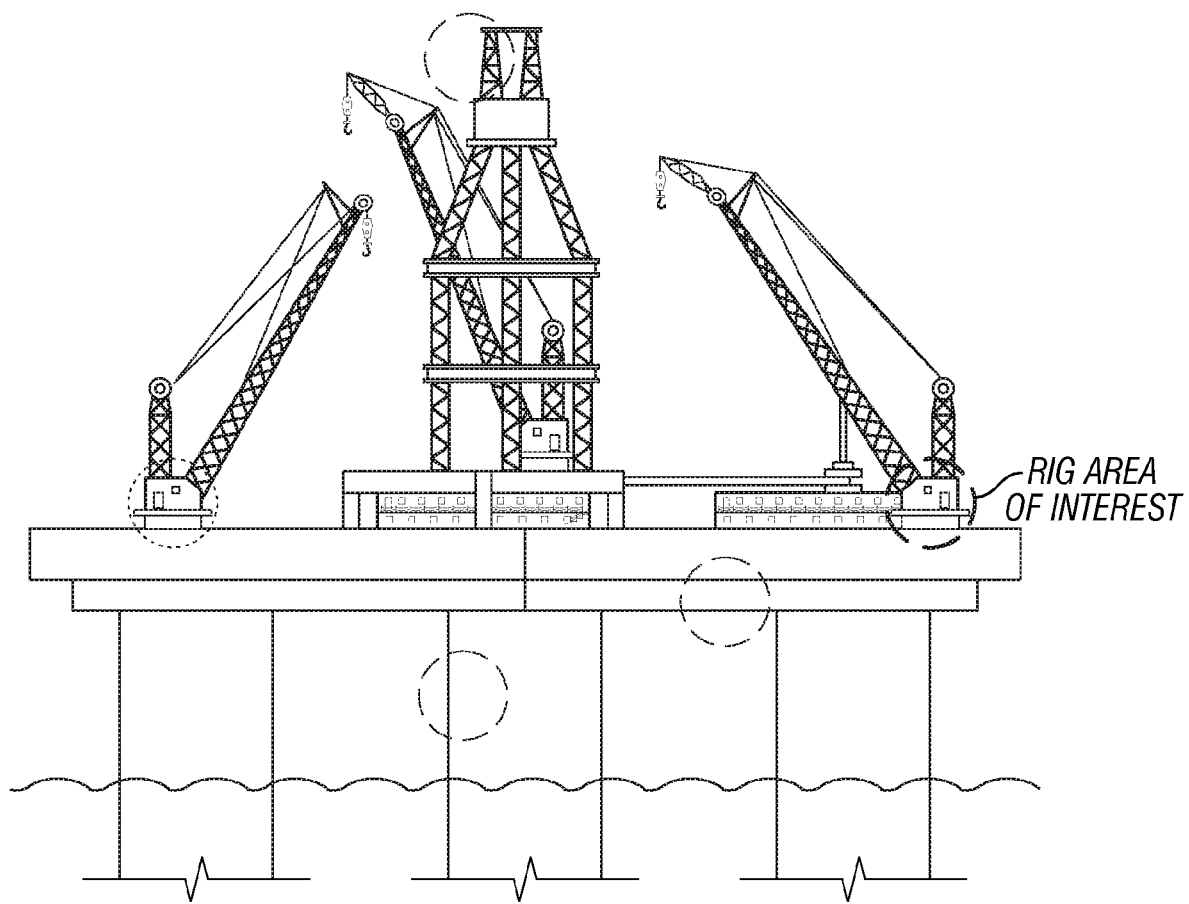
FIG. 4C presents an example end user dashboard screenshot of a rig or platform view of a platform/rig of interest containing equipment monitored using the predictive analysis system of the present invention.

In the Rig View of FIG. 4C, the specific Rig Area of Interest (or piece of equipment of interest on the rig) is again visually indicated with, e.g., a red circle while the other monitored rig areas operating acceptably are indicated with a green circle (or the like). In this screen shot, the viewer can quickly focus on visual markers on the photo/depiction of the platform that indicate whether the status of that particular Platform System is operational or in need of attention—for example, the compressors on the platform might be in need of attention and a red dot will be placed on the location of the compressors at issue on the platform diagram to draw the viewer's attention to such piece of equipment, while other "Operational" equipment being monitored will be indicated by a green dot.

Figures 4D, 4E:
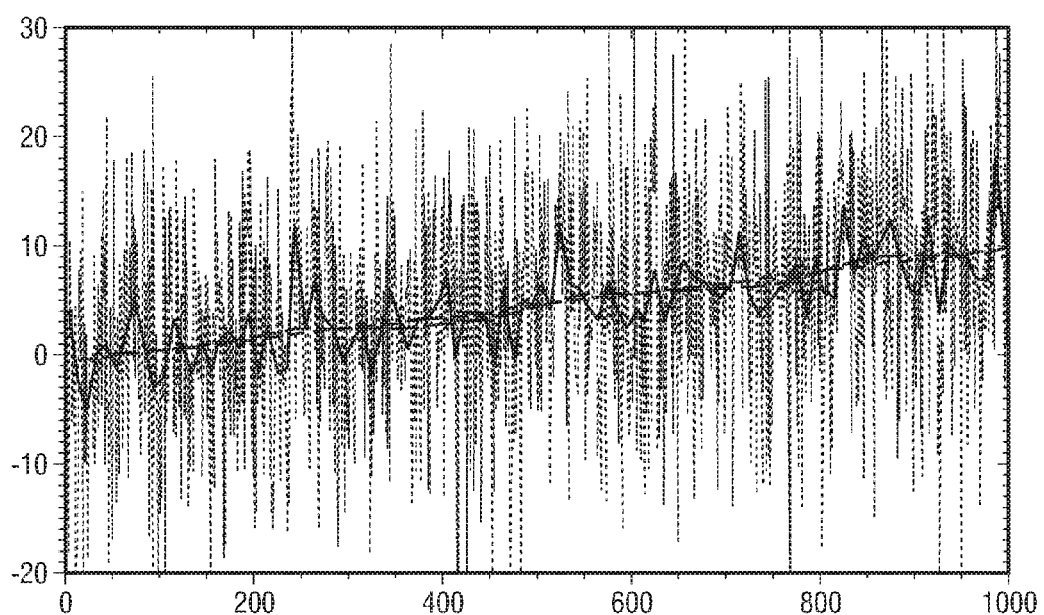
FIG. 4D presents an example end user dashboard screenshot of a system view of a platform of interest containing equipment monitored using the predictive analysis system of the present invention.
FIG. 4E presents an example end user dashboard screenshot of a specific operational data from equipment or sensor showing an alert condition on a platform of interest containing equipment monitored using the predictive analysis system of the present invention.

Drilling further down from the Rig Area of Interest by, e.g., clicking on the Rig Area of Interest on the Rig/Platform View, the end user can obtain a listing of the status of the various Platform Systems being monitored as shown in FIG. 4D. Within the platform are many Platform Systems that can be monitored. The System Status View shown in FIG. 4D will provide specific insight to the end user as to the specific system(s) in need of attention. The table listing these Platform Systems also notes their status, e.g., the compressors' status is "ATTENTION" (with a red visual dot to draw attention) while, e.g., the topdrive's status is "Operational".

Referring now to FIG. 4E, there is depicted a screenshot of the specific data from the equipment or sensor showing the alert. This data display could be contemporaneous, or could display historical operation data showing the history of the desired, selected Platform System, e.g., the compressors. The various screenshots shown in FIGS. 4A-4E are exemplary and could be set forth on multiple screens or on a single screenshot, or combinations thereof. Also, other views of interest could be created to customize the dashboard to deliver the desired data to the desired end user(s). For example, one end user may be a field engineer with responsibility for only the rigs shown in one basin, as such, it may be appropriate to limit this engineer's views to those rigs under this engineer's responsibility. On the other hand, at the management level, a regional manager might only need to see rigs/platforms within such region, while upper level management might need to have access to all of the data to manage the big picture. In any event, the intelligence going into the "alerts" seen by any of the end users comes from the intelligent, predictive data analysis of the present invention. Thus, a field engineer in an arctic region may very well be receiving data alerts that were created via the intelligent predictive NN/SOM analytic system using sensor data from all over the world for same or different equipment. Thus, through this dashboard, the needed personnel may view the running of the I-Platform predictive analytic software system for managing and monitoring their offshore and onshore surface equipment assets.

If desired, the end user can implement various commands back to the equipment on a desired platform/rig via an equipment feedback and control loop (via standard communications links).

Alternatively, the raw data from each piece of equipment could be directed to a Data Aggregator located at a remote location via appropriate communications links (e.g., VSAT).

As such, within a period of time that allows proactive intervention, the cross-correlation of input raw data through the DAE/NN/SOM becomes an advantageous tool which permits downtime reduction and reliability improvement by monitoring and analyzing cross-correlated, conditioned performance data before failures occur and the dispatch of the right personnel to take proactive steps to avoid downtime. The I-Platform system of the present invention can be used to manage performance of the machinery fleet and support capacity performance review and enhancement. The I-Platform system of the present invention aids in predicting the event, understanding the cause and eliminating the failure. By combining multiple data streams and applying business rules specific to the industry, field, and well, it is possible to generate custom notifications when a pre-determined combination of data stream conditions occurs. Alarms or notifications are sent via an operator dashboard to select personnel based on roles and key performance indicators (KIP). Moreover, data analysis capabilities and expert systems support root-cause-failure inquiries to identify impending equipment wear-out or failure. Historical data analysis can be brought to bear in decision-making to justify period extensions between overhauls or the rapid identification of fixed equipment fouling from remote locations. The system of the present invention is specifically designed to help understand the sources of variability in complex manufacturing processes. It enables on-demand and scheduled access to data in disparate data sources, such as paper records, data historians, and manufacturing execution systems (MES).

The system of the present invention provides process plant surface equipment intelligence solutions that reduce downtime and accelerate production revenue with its approach to data access, aggregation, predictive analytics and reporting. I-Platform system of the present invention leverages existing Information Technology investments to enable on-demand and scheduled access to all rotating machinery, instrument and controls, and process development data for process performance analysis and visibility in a rapid manner. Leading petroleum producers will increase profits by using the I-Platform solution to improve event predictability, key performance indicators and accelerate technology transfer.

Data and Results

To provide a proof of concept and prototype Intelligent Platform system implementation, a set of performance data from offshore operating assets was successfully aggregated and analyzed by trending and predictive analysis tools. Example thresholds, alarms, and notifications were then displayed to a common, role-based and configurable desktop dashboard for action by globally dispersed subject matter experts (see FIG. 5). The test data sets came from a major offshore drilling contractor with a versatile fleet of mobile offshore drilling units and the results were displayed using a real-time operational performance center at a leading oilfield service company. This use of data mining technologies is an indicator of advanced capability maturity in using oilfield data (Kozman and Gimenez, 2004). While most oil and gas operators are functioning at lower maturity levels than other data and technology intensive industries such as medical or retail (Kozman 2009), pending implementations of I-Platform technologies could help close this gap. The I-Platform of the present invention is also modular, configurable and adaptable to a wide range of operations, meaning it can be quickly leveraged in onshore operations with similar challenges. Operators in the Horn River play in northern British Columbia are currently evaluating the utility of I-Platform solutions in this harsh and remote winter operating environment (Levson et al., 2009).

In the I-Platform solution of the present invention, data is displayed in the increments that make it most valuable to the decision maker. The most frequent problem with delivery of offshore data to the office today is that operations personnel have a flood of data, but no way to reduce it down to actionable items. Too much data can be difficult to work with, too little may mask meaningful deviations that are important to preventative equipment analysis. The data stores must be able to aggregate and synchronize different time increments, and, by means of rules or model interaction, identify critical events from combinations of multiple data streams. Recent digital asset management strategies (Reece et al., 2008) require that production data must be evaluated in the context of a range of functions, including physical equipment management, configuration optimization, asset lifecycle management, and workflows and events related to maintenance and supply chain. Workflows such as predictive maintenance analysis, scheduling and dispatch can directly impact digital technology applications such as drilling rate optimization, production surveillance, and energy management.

The I-Platform concept benefits greatly from recent adoption of standards for delivery of wellsite data such as Wellsite information transfer standard markup language (WITSML). Operators and technology providers are already showing examples of large productivity and production increases (Henri-Bally, 2009) based on these standardized technologies, with the WITSML standard and existing WITSML-based technology serving as the technology component that makes it cost effective to implement business cases and also as a catalyst that makes it possible to identify new business cases (Grovik, 2009) for bringing wellsite data to the office.

Some challenges that have previously prevented successful offshore surface equipment monitoring are now successfully addressed with the deployment of the I-Platform system of the present invention. These challenges include current rig floor digital infrastructures, where monitoring requires collecting data from equipment that is not running on a common "bus." Accurate fault detection and root-cause analysis also requires multiple data streams from the platform to be correlated because maintenance on a specific equipment type is impacted not only by its own history, but the ambient conditions on the rig, such as climate and motion, which are seldom monitored by the same supplier. Fault detection requires pattern recognition and automated data analysis, but this analysis often calls for skills that are globally dispersed.

In a successful I-Platform solution, the many, diverse data sources are brought onto a single bus by means of a multi-level, secure local-area network (LAN). At many large multi-national oil companies with well developed and mature digital infrastructures (Wright, 2000) this network actually extends to offshore rigs at the business level. Newer technologies such as First Mile Wireless (FMW) have expanded this capability even further at higher bandwidths (Cisco 2007). Read-only access can therefore be achieved across the company business LAN. Advanced network implementations also can be configured for read-and-write access to data and packaged monitoring systems, or to support engineering functions accessed via desktop interfaces from on-shore locations. Open systems and standards, combined with use of select third-party analysis tools and services, and integrated at the database, web services, or application programming interface level, facilitate these advanced implementations. While the I-Platform concept can certainly address Global Best Practices for offshore oil companies, the same concept can be applied to remote onshore locations with similar maintenance and staffing challenges.

Onshore oilfields can in some cases provide even more challenges for bandwidth than offshore installations, and meeting the requirements for land oilfield operations has driven some now widely accepted telecommunication technology innovations (Gottlieb, 2004). In some cases where travel entails substantial health, safety, and environmental (HSE) risk, implementations involving integrated data streams from multiple sources can be cost justified based solely on a reduction in trips to the field (Shamsan and Kumar, 2005).

Until recently, this kind of access to production and asset-management data flows was site-specific and often controlled by a single equipment provider. This made it difficult to describe the dynamic nature of well behavior with a single holistic model. But once an asset is equipped with an infrastructure network proven for high data volumes and mission-critical applications, the relevant equipment performance streams, alarms, and notifications can be delivered to a distributed pool of global machinery expertise. This is enabled with the I-Platform system common interface to on-board packages and equipment, real-time data processing, alarm management, and historians. Notifications and alarms can be based on either simple threshold rules or complex performance models. In operations, such a system would allow for a global view of operations, and the ability to identify and locate events, as well as correlation of behaviour of similar equipment across multiple installations. The I-Platform system of the present invention allows rapid determination of the event's nature, whether it is a condition or a failure, an understanding of the cause of the failure, and when required, a deep-dive analysis of the problem that leads to its resolution.

Business-intelligence capabilities, a data-analysis engine and standard desktop dashboard tools provide additional powerful capabilities. By combining multiple data streams and applying business rules specific to the industry, field, and well, it is possible to generate custom notifications when a pre-determined combination of data stream conditions occurs. Alarms or notifications are sent via an operator dashboard to select personnel based on roles and key performance indicators (KPI).

The operator dashboard is a key component of the solution for its role-based view of client-specific maintenance and reliability KPIs, based on domain expertise collected during the concept of operations phase or preliminary site assessment. By tapping into the expertise of the pool of global machinery expertise, KPIs can be tailored to customer-specific metrics such as facility efficiency or energy consumption. The dashboard concept for data delivery makes it easy to incorporate new KPIs as they are developed and to include innovative concepts like mechanical specific energy (MSE), a measure of the amount of energy expended in the destruction of a unit volume of rock (Hacker, 2008). Individual equipment maintenance parameters can be tracked with respect to operating envelopes either specified by the manufacturer or developed from a history of use in particular environments. Advanced data analysis and mining capabilities and expert systems support root-cause-failure inquiries to identify impending equipment wear-out or failure. Historical data analysis can be brought to bear in decision making to justify period extensions between overhauls or the rapid identification of fixed equipment fouling from remote locations.

Geographic Information System (GIS) views of aggregated performance and predictive KPIs for offshore assets and drilldown view of surface equipment with threshold and alarm notifications can also be one of the many views displayed in the dashboard.

The I-Platform proof of concept show how a single dashboard can serve as the interface to multiple surface equipment assets, providing a global view of operations, the ability to identify and locate critical events as conditions or failures, and enough understanding of the cause to enable root-cause analysis and resolution. Neural networks and genetic algorithms can be a powerful tool in real-time environments involving large amounts of data. Their particular efficacy is the ability to predict behaviour, in a timeframe that allows proactive intervention, based on relationships and correlations between disparate data streams that can be overlooked in single domain solutions. This can provide an engineer with global responsibility and restricted schedules the time needed to react to impending conditions.

Recent forums such as the SPE Digital Energy Conference in Houston (April 2009) provide wide-ranging forums for the discussion of issues related to digital oil field deployments and other similar solutions. Among the notable takeaways from various forums, panels, and technical papers were issues that can be addressed by the I-Platform concept of the present invention. One operating company discussed their investment in digital technology and the return on investment (ROI) that led to production of an additional 85 million barrels of oil equivalent daily (MBOED), while another's i-field manager noted elements currently missing from his company's digital strategy that the I-Platform system of the present invention could resolve.

Another operating company described several examples of digital technology that could benefit from an I-Platform system implementation, and another reported some early problems with their test deployment of real-time well data and how they could be resolved with strategic technology deployments. One offshore operator admitted that their biggest challenge in using collaboration technology is not communicating between continents but getting people from the same building together to work on asset optimization, while another operating company discussed their plans for implementing real-time well data format standards in a pilot project. Yet another operating company identified the quality dimension that would bring the most added value to their production data in an I-Platform workflow, and another discussed the relative advantages of Low Earth Orbiting satellite communication versus very small aperture terminal (VSAT) for streaming data from offshore and other remote assets.

The I-Platform system of the present invention supports critical business drivers and workflows including downtime reduction reliability improvement, maintenance and reliability KPI development based on defined operating envelopes, and facility efficiency and energy-consumption optimization. The data analysis engine enables root-cause-failure analysis and early identification of pending equipment wear-out or failure, plus the justification to operators for extended overhaul periods. Fixed equipment fouling identification and OEM machinery fleet management can be incorporated in the Intelligent Platform concept, as well as capacity performance reviews and enhancement.

The I-Platform system of the present invention is a fully implemented solution that enables downtime reduction and reliability improvement by monitoring and analyzing offshore and onshore platform surface equipment performance data before failures occur, and providing rapid decision making support for the dispatch of the right personnel to take proactive steps to avoid downtime. A successful implementation can be used to manage performance of the offshore machinery fleet, and support capacity performance review and enhancement. The I-Platform system is an end-to-end offshore-to-onshore solution that brings together a unique set of mission-critical characteristics to ensure operational, development, and deployment efficiency, and a foundation for long-term project success.

In light of the foregoing teachings, another embodiment of the present disclosure also includes a computer program product, comprising a computer usable medium having a computer readable program code embodied therein, said computer readable program code adapted to be executed to implement a method for the training of a neural network used to generate predictive operational parameters for surface equipment and systems used on oil and gas platforms as described herein. In one embodiment, the method comprises: providing a system, wherein the system comprises distinct software modules, and wherein the distinct software modules comprise a data input module (to provide instruction to a user to identify and parse multiple digital data streams containing information relevant to the operating equipment or systems), a data formatting module (to correlate, time synchronize and standardize the digital data streams) and a data loading module (to identify and transmit the data streams as training data to the neural network).

All references referred to herein are incorporated herein by reference. While the apparatus, systems and methods of this invention have been described in terms of preferred or illustrative embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

U.S. Patent References:
U.S. Pat. No. 7,584,165 (Buchan, Sep. 1, 2009)
U.S. Pat. No. 5,710,578 (Beauregard, et al., Jan. 20, 1998)

OTHER REFERENCES

Athens Group, 2009. The State of NPT on High Specification Offshore Rigs: First Annual Benchmarking Report. Whitepaper, http://www.athensgroup. com/docs/The_State_of_NPT_on_High_Specification_Offshore_Rigs.pdf. Downloaded Jun. 22, 2009

Brynjolfsson, E., 1994. The Productivity Paradox of Information Technology: Review and Assessment Brynjolfsson, E. and Hitt, L., 2003. Computing Productivity: Firm-level Evidence. *Review of Economics and Statistics*, MIT Sloan Working Paper No. 4210-01. SSRN: http://ssrn.com/abstract=290325, DOI: 10.2139/ssrn.290325

Cisco, 2007. Petroleum Company Improves Real-time Information Sharing with Rigs, Cisco Customer Case Study, printed in the UK 31530/ecoutez/feb.07, http://www.cisco.com/web/strategy/docs/energy/Caseworks_31530_Petrobel_CS.pdf, downloaded Jun. 22, 2009

Cohen, A. S., and Nielson, D. L., 2007. Best Practices in the Development of Scientific Drilling Projects, Second Edition. U.S. National Science Foundation, http://www.dosecc.org/Best_Practices_-_2nd_Ed_-_FINAL.pdf. Downloaded Jun. 22, 2009

Eustes, A. W., 2007. The Evolution of Automation in Drilling. Paper SPE-111125 presented at the 2007 SPE Annual Technical Conference and Exhibition, Anaheim, Calif., U.S.A., Nov. 11-14, 2007

Feineman, D. R., 2009. Realizing Value From Real Time Well Monitoring In Greenfield Assets. Paper SPE-122676-MS presented at the SPE Digital Energy Conference and Exhibition, Apr. 7-8, 2009, Houston, Tex., USA. 10.2118/122676-MS Gottlieb, A., 2004. Satellite Service Providers and the Battle for the Oilfield Customer—How Application Focused Technologies are Changing the Market. *SatMagaine.com*, January 2004, Satnews Publishers, Sonoma, Calif., downloaded Jun. 22, 2009. http://www.satmagazine.com/jan2004/jan2004.pdf, pp. 29-32.

Grovik, L. O., 2009. WITSML status and road ahead in StatoilHydro. Presented at the Energistics WITSML Public Seminar & Vendor Exhibition meeting, May 28, 2009, Houston, Tex., USA. Downloaded Jun. 22, 2009, http://www.witsml. org/images/posc/meetings/may09witpub/03-LO.Grovik-StatoilHydro.pdf Hacker, J. M., 2008. An IOC's Experience in Implementing Digital Oilfield Technologies. Presented at the Abu Dhabi International Petroleum Exhibition and Conference, Nov. 3-6, 2008, Abu Dhabi, UAE. SPE-117837-MS, DOI: 10.2118/117837-MS Henry-Balli, R., 2009. Alwyn Field Case Study. Presented at the WITSML Public Seminar & Vendor Exhibition meeting, May 28, 2009, Houston, Tex., USA. Downloaded Jun. 22, 2009, http://www.witsml. org/images/posc/meetings/apr09StdsSeminar/apr09_ss_Henri-Bally_Total.pdf Heiberger, E., 2009. The Wisdom of Maturity. offshore-technology.com, SPG Media, Apr. 8, 2009. Downloaded Jun. 22, 2009. http://www.offshore-technology.com/features/feature52931/

Kozman, J., 2004. Applying Innovative Information Technologies to Oil & Gas Project Content. *Pipeline Magazine*, Issue 86, March 2004, http://www.pipelinedubai. com Kozman, J. and Gimenez, L., 2004. Maturity Models for E&P Data and Information Management Organizations. Presented at the Abu Dhabi International Conference and Exhibition, Oct. 10-13, 2004, Abu Dhabi, United Arab Emirates. SPE 88666-MS, 10.2118/88666-MS Kozman, J. and Ripley, T., 2008. Sustainable Spatial Architecture for Geo Engineering Data and Workflows. Paper SPE-116709 presented at the SPE Annual Technical Conference and Exhibition, Denver, Colo., USA, Sep. 21-24, 2008

Kozman, J., 2009. Enterprise Deployments of Model-Centric Workflows. Presented at the 13th International PNEC Conference on Data Integration, May 12-14, 2009 Houston, Tex., USA Levson, V., Walsh, W., Adams, C., Ferri, F., and Hayes, M., 2009, An Overview of Shale Gas Potential in Northeastern British Columbia. Presented at the 2009 CSPG CSEG CWLS Convention, May 4 to May 8, Calgary, Alberta, Canada, http://www. geoconvention.org/2009abstracts/236.pdf, downloaded Jun. 22, 2009

Microsoft PressPass, 2008. Compute power drives productivity, decision-making; reduces drilling delays and project risk. March 2008, http://www.microsoft. com/presspass/press/2008/mar08/03-25HPCSurveyPR.mspx, downloaded Jun. 22, 2009

Oberwinkler, C. and Stundner, M., 2005. From Real-Time Data to Production Optimization. *SPE Production & Facilities* 20 (3): 229-239. SPE-87008-PA, 10.2118/87008-PA Reece, C., Hoefner, M. L., Seetharam, R. V., and Killian, K. E., 2008. An Enterprise-Wide Approach to Implementing 'Digital Oilfield'. Presented at the Intelligent Energy Conference and Exhibition, Feb. 25-27, 2008, Amsterdam, The Netherlands. SPE-112151-MS, 10.2118/112151-MS Schlumberger, 2009. Avocet Surveillance powered by BabelFish. http://www.slb.com/media/services/software/production/avocetsurveillance.pdf downloaded Sep. 12, 2009.

Schlumberger, 2009. Avocet Surveillance powered by BabelFish—Integrated Date and Visualization Framework for Production Operations. http://www. slb.com/content/services/software/production/avocetsurveillance.asp Accessed Sep. 12, 2009.

Shafer, D., 2005. Would you like software with that? Presented at the AADE 2005 National Technical Conference and Exhibition, Houston, Tex., Apr. 5-7, 2005. AADE-05-NTCE-41

Shamsan, F. and Kumar, K. The Role of Geographical Information System in Land Acquisition and Optimization of Well Location. Presented at the SPE Middle East Oil and Gas Show and Conference, Mar. 12-15, 2005, Kingdom of Bahrain. SPE-93710-MS, 10.2118/93710-MS Stundner, M. and Nunez, G., 2006. Production Performance Monitoring Workflow. Presented at the First International Oil Conference and Exhibition, Cancun, Mexico, Aug. 31-Sep. 2, 2006. SPE 103757-MS, 10.2118/103757-MS Wood, T., 2007. The Connected Oilfield. Cisco Whitepaper, downloaded Jun. 22, 2009, Cisco Internet Business Solutions Group (IBSG). http://www.cisco. com/web/about/ac79/docs/wp/Connected_ Oilfield_0629b.pdf Wright, J., 2000. The Future of Fiber Optics in the Offshore Oil Industry (A review of the subsea applications of optical fiber). Published as: Optical fiber's gigabit bandwidth, 200 km range attractive for subsea work. *Offshore Magaine*, May 2000. www.oceandesigninc.com

We claim:

1. A computer implemented method for predictive analysis of multiple and varying topside equipment or topside systems used on one or more oil and gas field platforms located offshore or onshore comprising the steps of:

inputting to a data aggregator on a computer system real-time data streams from one or more sensors sensing topside parameters of interest on the multiple and varying topside equipment located on such one or more platforms, such topside equipment containing one or more sensors for monitoring in real-time the performance of such topside equipment based on such topside parameters of interest;

time-stamping such sensor data;

aggregating such sensor data into a common data format;

transmitting the aggregated, formatted sensor data to a computerized data analysis engine;

inputting into the data analysis engine multiple data streams containing information relevant to the topside operating equipment or topside systems;

providing a neural network within the data analysis engine;

generating self organizing maps within the data analysis engine;

using the neural network engine to transform the multiple and varying topside equipment data streams from a monitoring state, function or use to a predictive state, function or use;

generating status indicators in real-time relevant to the operation of the topside equipment or topside systems;

transmitting such status indicators to one or more end users over a network; and providing a computer-based dashboard software-based display system for displaying to such end user(s) such transmitted data.

2. The method of claim 1 further comprising the step of training the neural network to cross-correlate the multiple data streams and look for relationships between the incoming data streams.

3. The method of claim 1 further comprising the step of operating the neural network in an untrained mode.

4. The method of claim 1 wherein the multiple data streams comprise: manufacturer's operational parameters for the equipment and systems and historical performance data obtained from monitoring the actual operation of a piece of equipment in different operating environments.

5. The method of claim 4 further comprising the step of training the neural network to cross-correlate the real-time sensor data and the manufacturer's operational parameters and look for relationships between the incoming data streams.

6. The method of claim 4 further comprising the step of operating the neural network in an untrained mode.

7. The method of claim 1 further comprising the step of deriving functions from the data streams using the neural network, wherein the functions are both continuous and differentiable.

8. The method of claim 7 further comprising the step of deriving errors by comparing the input data streams with the predictive states from the neural network.

9. The method of claim 8 further comprising the step of using the derived errors to train the neural network.

10. The method of claim 1 further comprising the steps of:
providing a cascade-forward back-propagation network, having multiple layers, within the data analysis engine;
inputting the data streams directly into each layer of the cascade-forward back-propagation network;
and using higher-order polynomials within the cascade-forward back-propagation network to model nonlinear relationships among the data streams.

11. The method of claim 10 further comprising the steps of: deriving functions from the data streams using the neural network, wherein the functions are both continuous and differentiable; deriving errors by comparing the input data streams with the predictive states from the neural network; and using the predictive states to limit the data streams input into the cascade-forward back-propagation network by eliminating data points that fall outside of the errors.

12. The method of claim 11 further comprising the step of comparing the predictive state to the input data stream for use in generating status indicators.

13. The computer implemented method of claim 1 comprising the further step of filtering the data streams before the step of transmitting the selected data to the data analysis engine.

14. A computer implemented system for remotely predicting the performance of multiple and varying topside equipment and topside systems used on one or more oil and gas field platforms located offshore or onshore comprising:

a. a processor and memory;

b. a data aggregator embodied on one or more computer-readable medium for gathering real-time data streams from the multiple and varying topside equipment located on such one or more platforms, such topside equipment containing one or more sensors for monitoring in real time the performance of operational topside parameters of interest in such topside equipment or topside systems;

c. a data analysis engine embodied on the one or more computer-readable medium in network communication with the data aggregator and capable of receiving data streams from the data aggregator, the data analysis engine comprising a neural network capable of generating self organizing maps, and creating predictive operational indicators regarding such topside equipment and systems;

d. an interface embodied on the one or more computer-readable medium for inputting into the neural network multiple data streams containing information relevant to the topside operating equipment or topside systems;

e. a network user interface embodied on the one or more computer-readable medium for transmitting such predictive operational indicators from the data analysis engine to one or more end user computer terminals equipped with end user dashboard display software, and;

f. an interface embodied on the one or more computer-readable medium for inputting sensor data to the data aggregator.

15. The system of claim 14 further comprising: a cascade-forward back-propagation network, having multiple layers, within the data analysis engine and an interface for inputting the data streams directly into each layer of the cascade-forward back-propagation network.

16. The system of claim 14 wherein the data aggregator is also capable of time-stamping and aggregating the data streams into a common data format, and optionally filtering the data streams prior to communication of the data streams to the data analysis engine.

17. A computer program product embodied on one or more non-transitory computer-readable medium, said computer program product adapted to be executed to implement a method for the training of a neural network used to generate predictive operational parameters for multiple and varying topside equipment and topside systems used on oil and gas platforms, said method comprising: providing a computer implemented system, wherein the computer implemented system comprises distinct software modules embodied on the one or more computer-readable medium, and wherein the distinct software modules comprise a data input module embodied on the one or more computer-readable medium to provide instruction to a user to identify and parse multiple digital data streams containing information relevant to the operating equipment or systems, a data formatting module embodied on the one or more computer-readable medium to correlate, time synchronize and standardize the digital data streams and a data loading module embodied on the one or more computer-readable medium to identify and transmit the data streams as training data to the neural network.

* * * * *